(12) United States Patent
Hisayama et al.

(10) Patent No.: US 12,276,444 B2
(45) Date of Patent: Apr. 15, 2025

(54) REFRIGERATION CYCLE DEVICE

(71) Applicant: DAIKIN INDUSTRIES, LTD., Osaka (JP)

(72) Inventors: Kazushi Hisayama, Osaka (JP); Kebi Chen, Osaka (JP); Tetsuya Okamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 571 days.

(21) Appl. No.: 17/484,858

(22) Filed: Sep. 24, 2021

(65) Prior Publication Data
US 2022/0011020 A1    Jan. 13, 2022

Related U.S. Application Data

(63) Continuation of application No. PCT/JP2020/013873, filed on Mar. 26, 2020.

(30) Foreign Application Priority Data

Mar. 29, 2019   (JP) .................................. 2019-067716

(51) Int. Cl.
*F25B 1/10*    (2006.01)
*F25B 49/02*    (2006.01)

(52) U.S. Cl.
CPC .............. *F25B 1/10* (2013.01); *F25B 49/022* (2013.01)

(58) Field of Classification Search
CPC .... F25B 1/10; F25B 49/022; F25B 2600/022; F25B 2600/0271; F25B 41/42;
(Continued)

(56) References Cited

U.S. PATENT DOCUMENTS 4,947,655 A    8/1990  Shaw
5,927,088 A    7/1999  Shaw
(Continued)

FOREIGN PATENT DOCUMENTS

CN    105758034 A    7/2016
CN    206803544 U    12/2017
(Continued)

OTHER PUBLICATIONS

CN 107816816 A Translation (Year: 2018).*
(Continued)

*Primary Examiner* — Elizabeth J Martin
*Assistant Examiner* — Dario Antonio Deleon
(74) *Attorney, Agent, or Firm* — BIRCH, STEWART, KOLASCH & BIRCH, LLP

(57) ABSTRACT

A refrigerant circuit includes a first compressor, a second compressor, a heat-source-side heat exchanger, an expansion mechanism, and a use-side heat exchanger. The refrigerant circuit is capable of performing a single-stage compression operation in which one of the first compressor and the second compressor is driven and the other is stopped, and a two-stage compression operation in which both the first compressor and the second compressor are driven. The control unit controls the refrigerant circuit so that, of the single-stage compression operation and the two-stage compression operation, an operation with a higher compression efficiency is performed.

20 Claims, 8 Drawing Sheets

(58) Field of Classification Search
CPC .............. F25B 2400/13; F25B 2700/19; F25B 2700/21; F25B 2700/21152; F25B 41/20; F25B 41/31; F25B 49/02; Y02B 30/70
See application file for complete search history.

(56) References Cited

U.S. PATENT DOCUMENTS

| | | | | |
|---|---|---|---|---|
| 2008/0173034 | A1* | 7/2008 | Shaw ..................... | F25B 13/00 |
| | | | | 62/160 |
| 2009/0282849 | A1* | 11/2009 | Fujimoto et al. ......... | F25B 1/10 |
| | | | | 62/228.5 |

FOREIGN PATENT DOCUMENTS

| | | | | | |
|---|---|---|---|---|---|
| CN | 107816816 | A | * | 3/2018 | ................ F24F 1/10 |
| CN | 107818816 | A | | 3/2018 | |
| JP | 2-133757 | A | | 5/1990 | |
| JP | 2000314566 | A | * | 11/2000 | ................ F25B 1/10 |
| JP | 2002-228275 | A | | 8/2002 | |
| JP | 2008-64421 | A | | 3/2008 | |
| JP | 2008064421 | A | * | 3/2008 | ................ F24B 1/00 |
| JP | 2010-121801 | A | | 6/2010 | |
| JP | 2012-42114 | A | | 3/2012 | |
| JP | 2013-36631 | A | | 2/2013 | |
| KR | 10-2012-0077106 | A | | 7/2012 | |
| WO | WO 2006/098808 | A2 | | 9/2006 | |

OTHER PUBLICATIONS

JP 2008064421 A Translation (Year: 2008).*
JP 2000314566 A Translation (Year: 2000).*
International Preliminary Report on Patentability and English translation of the Written Opinion of the International Searching Authority for International Application No. PCT/JP2020/013873, dated Oct. 14, 2021.
Extended European Search Report for European Application No. 20783739.4, dated Apr. 20, 2022.
International Search Report for PCT/JP2020/013873 mailed on Jun. 30, 2020.

* cited by examiner

REFRIGERATION CYCLE DEVICE

CROSS REFERENCE TO RELATED APPLICATIONS

This application is a Continuation of PCT International Application No. PCT/JP2020/013873, filed on Mar. 26, 2020, which claims priority under 35 U.S.C. 119 (a) to Patent Application No. 2019-067716, filed in Japan on Mar. 29, 2019, all of which are hereby expressly incorporated by reference into the present application.

TECHNICAL FIELD

The present disclosure relates to a refrigeration cycle device.

BACKGROUND ART

PTL 1 discloses a refrigeration device including a refrigerant circuit in which a lower-stage-side compression mechanism, a higher-stage-side compression mechanism, a condenser, an expansion mechanism, and an evaporator are connected in order. This refrigeration device is capable of switching between a single-stage compression operation in which one of the lower-stage-side compression mechanism and the higher-stage-side compression mechanism is driven and the other is stopped, and a two-stage compression operation in which both the lower-stage-side compression mechanism and the higher-stage-side compression mechanism are driven. This refrigeration device also includes switching control means. This switching control means switches an operation state so that the single-stage compression operation is performed if a high-low differential pressure between high-pressure refrigerant and low-pressure refrigerant in the refrigerant circuit is lower than a predetermined first set pressure value and that the two-stage compression operation is performed if the high-low differential pressure is higher than or equal to the predetermined first set pressure value.

CITATION LIST

Patent Literature

[PTL 1] Japanese Unexamined Patent Application Publication No. 2008-64421

SUMMARY

A first aspect of the present disclosure relates to a refrigeration cycle device. The refrigeration cycle device includes a refrigerant circuit (20) including a first compressor (21), a second compressor (22), a heat-source-side heat exchanger (24), an expansion mechanism (26), and a use-side heat exchanger (27), and capable of performing a single-stage compression operation in which one of the first compressor (21) and the second compressor (22) is driven and an other is stopped, and a two-stage compression operation in which both the first compressor (21) and the second compressor (22) are driven; and a control unit (100) configured to control the refrigerant circuit (20) so that, of the single-stage compression operation and the two-stage compression operation, an operation with a higher compression efficiency is performed.

DESCRIPTION OF EMBODIMENTS

Figure 1:
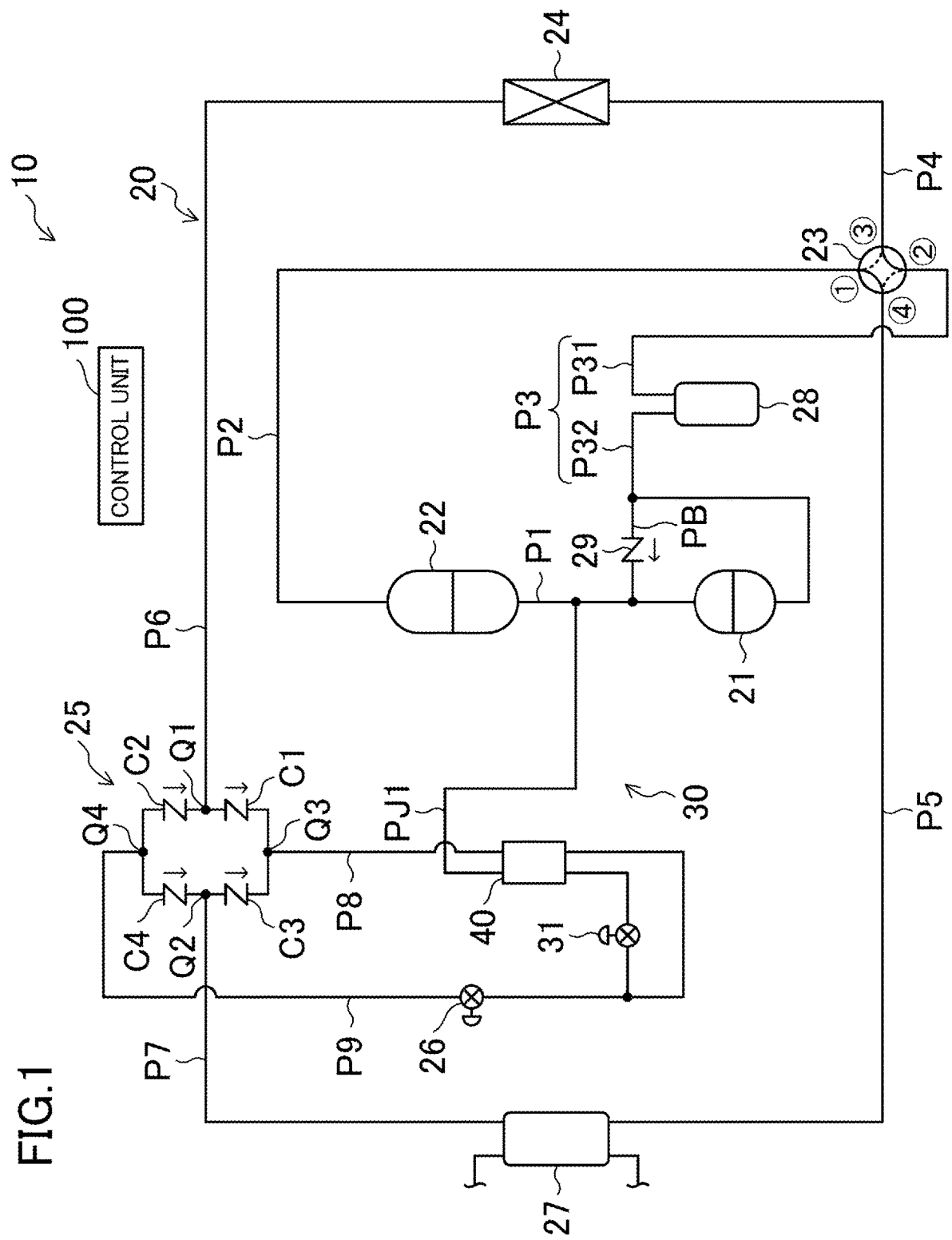
FIG. 1 is a piping diagram illustrating the configuration of a refrigeration cycle device of Embodiment 1.

Hereinafter, embodiments will be described in detail with reference to the drawings. In the drawings, the same parts or corresponding parts are denoted by the same reference numerals, and the description thereof is not repeated.

Embodiment 1

FIG. 1 illustrates the configuration of a refrigeration cycle device (10) according to Embodiment 1. In this example, the refrigeration cycle device (10) constitutes an air conditioner that performs a heating operation of heating water (one example of a use-side fluid) supplied to an air conditioning target space (not illustrated) to heat the air conditioning target space, and a cooling operation of cooling water supplied to the air conditioning target space to cool the air conditioning target space. The refrigeration cycle device (10) includes a refrigerant circuit (20), an injection circuit (30), an intermediate heat exchanger (40), and a control unit (100).

[Refrigerant Circuit]

The refrigerant circuit (20) includes a first compressor (21), a second compressor (22), a four-way switching valve (23), a heat-source-side heat exchanger (24), a check valve bridge (25), an expansion mechanism (26), a use-side heat exchanger (27), an accumulator (28), and a bypass check valve (29). The refrigerant circuit (20) is filled with refrigerant. The refrigerant circulates in the refrigerant circuit (20), and thus a refrigeration cycle is performed. The refrigerant is, for example, R410A, R32, R407C, or the like.

The refrigerant circuit (20) is capable of performing a single-stage compression operation and a two-stage compression operation. In the single-stage compression operation, one of the first compressor (21) and the second compressor (22) is driven and the other is stopped. In the two-stage compression operation, both the first compressor (21) and the second compressor (22) are driven. The single-stage compression operation and the two-stage compression operation will be described in detail below.

<First Compressor>

The first compressor (21) compresses sucked refrigerant and discharges the compressed refrigerant. For example, the first compressor (21) may be a scroll compressor, a rotary compressor, a rolling-piston compressor, a turbo compressor, or another type of compressor. The rotary compressor is a compressor in which a piston and a blade (vane) are separated from each other. The rolling-piston compressor is a compressor in which a piston and a blade are integrated together.

The number of rotations of the first compressor (21) is variable. For example, in the first compressor (21), the number of rotations of a motor provided in the first compressor (21) is changed in response to a change in the output frequency of an inverter (not illustrated) electrically connected to the first compressor (21). As a result, the number of rotations (operation frequency) of the first compressor (21) is changed.

<Second Compressor>

The second compressor (22) compresses sucked refrigerant and discharges the compressed refrigerant. For example, the second compressor (22) may be a scroll compressor, a rotary compressor, a rolling-piston compressor, a turbo compressor, or another type of compressor.

The number of rotations of the second compressor (22) is variable, as in the first compressor (21). For example, in the second compressor (22), the number of rotations of a motor provided in the second compressor (22) is changed in response to a change in the output frequency of an inverter (not illustrated) electrically connected to the second compressor (22). As a result, the number of rotations (operation frequency) of the second compressor (22) is changed.

In this example, the second compressor (22) is configured to compress refrigerant discharged by the first compressor (21). Specifically, a suction side of the second compressor (22) is connected to a discharge side of the first compressor (21) via a first refrigerant pipe (P1).

<Four-Way Switching Valve>

A first port of the four-way switching valve (23) is connected to a discharge side of the second compressor (22) via a second refrigerant pipe (P2). A second port of the four-way switching valve (23) is connected to a suction side of the first compressor (21) via a third refrigerant pipe (P3). A third port of the four-way switching valve (23) is connected to a gas side of the heat-source-side heat exchanger (24) via a fourth refrigerant pipe (P4). A fourth port of the four-way switching valve (23) is connected to a gas side of the use-side heat exchanger (27) via a fifth refrigerant pipe (P5).

The four-way switching valve (23) is switched between a first flow path state (a state indicated by solid lines in FIG. 1) in which the first port and the fourth port communicate with each other and the second port and the third port communicate with each other, and a second flow path state (a state indicated by broken lines in FIG. 1) in which the first port and the third port communicate with each other and the second port and the fourth port communicate with each other.

<Heat-Source-Side Heat Exchanger>

The heat-source-side heat exchanger (24) causes refrigerant and a heat-source-side fluid to exchange heat with each other. In this example, the heat-source-side heat exchanger (24) causes refrigerant and air (one example of a heat-source-side fluid) to exchange heat with each other.

<Check Valve Bridge>

The check valve bridge (25) supplies refrigerant flowed out of a heat exchanger serving as a condenser (radiator) of the heat-source-side heat exchanger (24) and the use-side heat exchanger (27) to the expansion mechanism (26), and supplies refrigerant flowed out of the expansion mechanism (26) to a heat exchanger serving as an evaporator of the heat-source-side heat exchanger (24) and the use-side heat exchanger (27).

Specifically, the check valve bridge (25) includes a first check valve (C1), a second check valve (C2), a third check valve (C3), and a fourth check valve (C4). Each of the first to fourth check valves (C1 to C4) allows a flow of refrigerant in the direction indicated by the arrow in FIG. 1 and checks a flow of refrigerant in the opposite direction. The first check valve (C1) and the second check valve (C2) are connected in series. The third check valve (C3) and the fourth check valve (C4) are connected in series. The first check valve (C1) and the third check valve (C3) are connected to each other. The second check valve (C2) and the fourth check valve (C4) are connected to each other.

A first connection point (Q1), which is a connection point between the first check valve (C1) and the second check valve (C2), is connected to a liquid side of the heat-source-side heat exchanger (24) via a sixth refrigerant pipe (P6). A second connection point (Q2), which is a connection point between the third check valve (C3) and the fourth check valve (C4), is connected to a liquid side of the use-side heat exchanger (27) via a seventh refrigerant pipe (P7). A third connection point (Q3), which is a connection point between the first check valve (C1) and the third check valve (C3), is connected to the expansion mechanism (26) via an eighth refrigerant pipe (P8). A fourth connection point (Q4), which is a connection point between the second check valve (C2) and the fourth check valve (C4), is connected to the expansion mechanism (26) via a ninth refrigerant pipe (P9).

<Expansion Mechanism>

The expansion mechanism (26) expands refrigerant and reduces the pressure of the refrigerant. In this example, the expansion mechanism (26) is constituted by an expansion valve (for example, an electronic expansion valve) whose opening degree is adjustable.

<Use-Side Heat Exchanger>

The use-side heat exchanger (27) causes refrigerant and a use-side fluid to exchange heat with each other. In this example, the use-side heat exchanger (27) causes refrigerant and water (one example of a use-side fluid) to exchange heat with each other.

<Accumulator>

The accumulator (28) is provided in the third refrigerant pipe (P3). Specifically, the third refrigerant pipe (P3) includes a first pipe portion (P31) that connects the second port of the four-way switching valve (23) and an inlet side of the accumulator (28), and a second pipe portion (P32) that connects an outlet side of the accumulator (28) and the suction side of the first compressor (21).

<Bypass Check Valve>

The bypass check valve (29) is provided for supplying refrigerant to the suction side of the second compressor (22) by bypassing the first compressor (21) when the first compressor (21) is stopped. Specifically, a midway portion of the second pipe portion (P32) of the third refrigerant pipe (P3) is connected to a midway portion of the first refrigerant pipe (P1) via a bias pipe (PB). The bypass check valve (29) is provided in the bias pipe (PB). The bypass check valve (29) allows a flow of refrigerant in the direction from the third refrigerant pipe (P3) toward the first refrigerant pipe (P1) and checks a flow of refrigerant in the opposite direction.

[Injection Circuit]

The injection circuit (30) supplies, to the suction side of the second compressor (22), part of refrigerant flowing from, of the heat-source-side heat exchanger (24) and the use-side heat exchanger (27), a heat exchanger serving as a condenser (radiator) toward the expansion mechanism (26) in the two-stage compression operation. Specifically, the injection circuit (30) includes an injection expansion valve (31). The injection circuit (30) is provided with a first injection pipe (PJ1). One end of the first injection pipe (PJ1) is connected to a midway portion of the eighth refrigerant pipe (P8). The other end of the first injection pipe (PJ1) is connected to a midway portion of the first refrigerant pipe (P1). The first injection pipe (PJ1) is provided with the injection expansion valve (31). The injection expansion valve (31) decompresses refrigerant flowing through the injection circuit (30) (in this example, refrigerant flowing through the first injection pipe (PJ1)).

[Intermediate Heat Exchanger]

The intermediate heat exchanger (40) causes heat exchange to be performed between refrigerant flowed out of a heat exchanger serving as a condenser (radiator) of the heat-source-side heat exchanger (24) and the use-side heat exchanger (27) and refrigerant decompressed by the injection expansion valve (31). In this example, the intermediate heat exchanger (40) is connected to a pipe portion of the eighth refrigerant pipe (P8), the pipe portion being located between one end of the eighth refrigerant pipe (P8) (the third connection point Q3) and a connection point between the eighth refrigerant pipe (P8) and the first injection pipe (PJ1). The intermediate heat exchanger (40) is also connected to a pipe portion of the first injection pipe (PJ1), the pipe portion being located between the injection expansion valve (31) and the other end of the first injection pipe (PJ1) (a connection point between the first injection pipe (PJ1) and the first refrigerant pipe (P1)). The intermediate heat exchanger (40) causes refrigerant flowing through these pipe portions to exchange heat.

[Various Sensors]

The refrigeration cycle device (10) is provided with various sensors (not illustrated), such as a temperature sensor that detects a temperature of refrigerant or the like and a pressure sensor that detects a pressure of refrigerant or the like. Detection results (signals) of these various sensors are transmitted to the control unit (100).

[Control Unit]

The control unit (100) controls individual units of the refrigeration cycle device (10) to control an operation of the refrigeration cycle device (10) on the basis of signals of the various sensors provided in the refrigeration cycle device (10) or a control signal from the outside. Specifically, the control unit (100) controls the first compressor (21), the second compressor (22), the four-way switching valve (23), the expansion mechanism (26), and the injection expansion valve (31). For example, the control unit (100) is constituted by a processor and a memory that is electrically connected to the processor and that stores a program and information for operating the processor.

[Operation of Refrigeration Cycle Device]

In the refrigeration cycle device (10) of Embodiment 1, a single-stage compression operation and a two-stage compression operation are performed. In the single-stage compression operation, one of the first compressor (21) and the second compressor (22) is stopped, and the other of the first compressor (21) and the second compressor (22) is driven. In this example, the first compressor (21) is stopped, and the second compressor (22) is driven. In the two-stage compression operation, both the first compressor (21) and the second compressor (22) are driven. In this example, a single-stage compression heating operation and a single-stage compression cooling operation are performed as the single-stage compression operation, and a two-stage compression heating operation and a two-stage compression cooling operation are performed as the two-stage compression operation.

<Single-Stage Compression Heating Operation>

In the single-stage compression heating operation, a refrigeration cycle is performed in which the use-side heat exchanger (27) serves as a condenser (radiator) and the heat-source-side heat exchanger (24) serves as an evaporator. Specifically, the four-way switching valve (23) is set to the first flow path state (the state indicated by solid lines in FIG. 1). The amount of decompression in the expansion mechanism (26) (specifically, the opening degree of the expansion valve constituting the expansion mechanism (26)) is adjusted as appropriate. The injection expansion valve (31) is set to a fully closed state. The first compressor (21) is stopped, and the second compressor (22) is driven.

The refrigerant discharged by the second compressor (22) passes through the four-way switching valve (23), and radiates heat to a use-side fluid to condense in the use-side heat exchanger (27). The refrigerant flowed out of the use-side heat exchanger (27) passes through the check valve bridge (25), and is decompressed by the expansion mechanism (26). The refrigerant decompressed by the expansion mechanism (26) passes through the check valve bridge (25), and absorbs heat from a heat-source-side fluid to evaporate in the heat-source-side heat exchanger (24). The refrigerant flowed out of the heat-source-side heat exchanger (24) passes through the four-way switching valve (23), the accumulator (28), and the bypass check valve (29) in order, and is sucked and compressed by the second compressor (22).

<Single-Stage Compression Cooling Operation>

In the single-stage compression cooling operation, a refrigeration cycle is performed in which the heat-source-side heat exchanger (24) serves as a condenser (radiator) and the use-side heat exchanger (27) serves as an evaporator. Specifically, the four-way switching valve (23) is set to the second flow path state (the state indicated by broken lines in FIG. 1). The amount of decompression in the expansion mechanism (26) (specifically, the opening degree of the expansion valve constituting the expansion mechanism (26)) is adjusted as appropriate. The injection expansion valve (31) is set to a fully closed state. The first compressor (21) is stopped, and the second compressor (22) is driven.

The refrigerant discharged by the second compressor (22) passes through the four-way switching valve (23), and radiates heat to a heat-source-side fluid to condense in the heat-source-side heat exchanger (24). The refrigerant flowed out of the heat-source-side heat exchanger (24) passes through the check valve bridge (25), and is decompressed by the expansion mechanism (26). The refrigerant decompressed by the expansion mechanism (26) passes through the check valve bridge (25), and absorbs heat from a use-side fluid to evaporate in the use-side heat exchanger (27). The refrigerant flowed out of the use-side heat exchanger (27) passes through the four-way switching valve (23), the accumulator (28), and the bypass check valve (29) in order, and is sucked and compressed by the second compressor (22).

<Two-Stage Compression Heating Operation>

In the two-stage compression heating operation, a refrigeration cycle is performed in which the use-side heat exchanger (27) serves as a condenser (radiator) and the heat-source-side heat exchanger (24) serves as an evaporator. Specifically, the four-way switching valve (23) is set to the first flow path state (the state indicated by solid lines in FIG. 1). The amount of decompression in the expansion mechanism (26) (specifically, the opening degree of the expansion valve constituting the expansion mechanism (26)) and the opening degree of the injection expansion valve (31) are adjusted as appropriate. Both the first compressor (21) and the second compressor (22) are driven.

The refrigerant discharged by the second compressor (22) passes through the four-way switching valve (23), and radiates heat to a use-side fluid to condense in the use-side heat exchanger (27). The refrigerant flowed out of the use-side heat exchanger (27) passes through the check valve bridge (25), flows through the eighth refrigerant pipe (P8), and radiates heat to the refrigerant flowing through the first injection pipe (PJ1) of the injection circuit (30) so as to be subcooled in the intermediate heat exchanger (40). Part of the refrigerant flowed out of the intermediate heat exchanger (40) and flowing through the eighth refrigerant pipe (P8) is supplied to the injection circuit (30), and the remaining part thereof is supplied to the expansion mechanism (26).

The refrigerant supplied to the expansion mechanism (26) is decompressed by the expansion mechanism (26), passes through the check valve bridge (25), and absorbs heat from a heat-source-side fluid to evaporate in the heat-source-side heat exchanger (24). The refrigerant flowed out of the heat-source-side heat exchanger (24) passes through the four-way switching valve (23) and the accumulator (28) in order, and is sucked and compressed by the first compressor (21). The refrigerant discharged by the first compressor (21) is sucked and compressed by the second compressor (22).

On the other hand, the refrigerant supplied to the injection circuit (30) flows through the first injection pipe (PJ1), is decompressed by the injection expansion valve (31), and absorbs heat from the refrigerant flowing through the eighth refrigerant pipe (P8) in the intermediate heat exchanger (40). The refrigerant flowed out of the intermediate heat exchanger (40) and flowing through the first injection pipe (PJ1) is supplied to a midway portion of the first refrigerant pipe (P1). The refrigerant supplied to the first refrigerant pipe (P1) joins the refrigerant discharged by the first compressor (21), and is sucked and compressed by the second compressor (22). Accordingly, the refrigerant sucked by the second compressor (22) is cooled.

<Two-Stage Compression Cooling Operation>

In the two-stage compression cooling operation, a refrigeration cycle is performed in which the heat-source-side heat exchanger (24) serves as a condenser (radiator) and the use-side heat exchanger (27) serves as an evaporator. Specifically, the four-way switching valve (23) is set to the second flow path state (the state indicated by broken lines in FIG. 1). The amount of decompression in the expansion mechanism (26) (specifically, the opening degree of the expansion valve constituting the expansion mechanism (26)) and the opening degree of the injection expansion valve (31) are adjusted as appropriate. Both the first compressor (21) and the second compressor (22) are driven.

The refrigerant discharged by the second compressor (22) passes through the four-way switching valve (23), and radiates heat to a heat-source-side fluid to condense in the heat-source-side heat exchanger (24). The refrigerant flowed out of the heat-source-side heat exchanger (24) passes through the check valve bridge (25), flows through the eighth refrigerant pipe (P8), and radiates heat to the refrigerant flowing through the first injection pipe (PJ1) of the injection circuit (30) so as to be subcooled in the intermediate heat exchanger (40). Part of the refrigerant flowed out of the intermediate heat exchanger (40) and flowing through the eighth refrigerant pipe (P8) is supplied to the injection circuit (30), and the remaining part thereof is supplied to the expansion mechanism (26).

The refrigerant supplied to the expansion mechanism (26) is decompressed by the expansion mechanism (26), passes through the check valve bridge (25), and absorbs heat from a use-side fluid to evaporate in the use-side heat exchanger (27). The refrigerant flowed out of the use-side heat exchanger (27) passes through the four-way switching valve (23) and the accumulator (28) in order, and is sucked and compressed by the first compressor (21). The refrigerant discharged by the first compressor (21) is sucked and compressed by the second compressor (22).

On the other hand, the refrigerant supplied to the injection circuit (30) flows through the first injection pipe (PJ1), is decompressed by the injection expansion valve (31), and absorbs heat from the refrigerant flowing through the eighth refrigerant pipe (P8) in the intermediate heat exchanger (40). The refrigerant flowed out of the intermediate heat exchanger (40) and flowing through the first injection pipe (PJ1) is supplied to a midway portion of the first refrigerant pipe (P1). The refrigerant supplied to the first refrigerant pipe (P1) joins the refrigerant discharged by the first compressor (21), and is sucked and compressed by the second compressor (22). Accordingly, the refrigerant sucked by the second compressor (22) is cooled.

[Description of Compression Efficiency]

Next, compression efficiencies in the refrigeration cycle device (10) of Embodiment 1 will be described with reference to FIG. 2. In the refrigeration cycle device (10) of Embodiment 1, a compression efficiency ($\eta 1$) in the single-stage compression operation and a compression efficiency ($\eta 2$) in the two-stage compression operation are taken into consideration. The vertical axis in FIG. 2 indicates compression efficiency ($\eta$), and the horizontal axis in FIG. 2 indicates required capacity (Q) of the refrigerant circuit (20) (the capacity required for the refrigerant circuit (20)).

Figure 2:
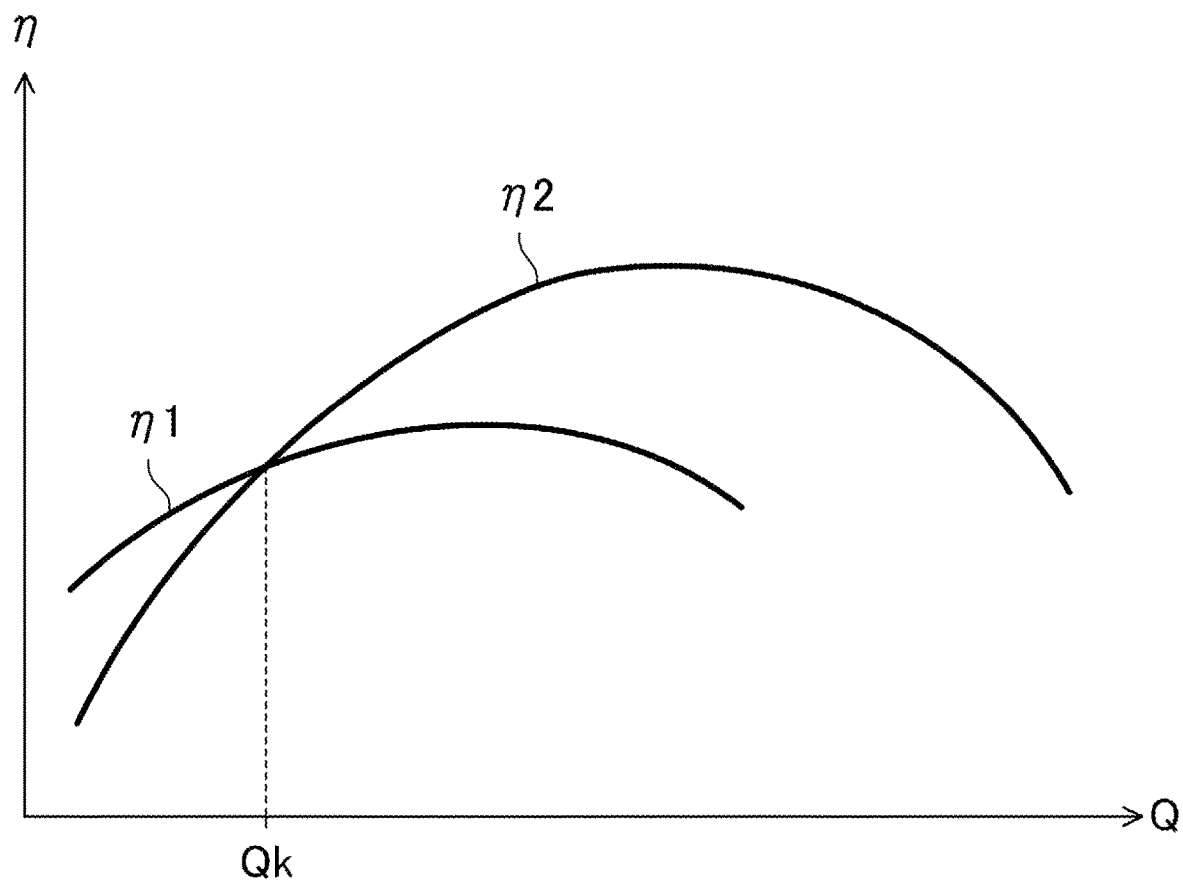
FIG. 2 is a graph for describing compression efficiencies in a single-stage compression operation and a two-stage compression operation.

As illustrated in FIG. 2, the compression efficiency ($\eta 1$) in the single-stage compression operation changes in accordance with the required capacity (Q) of the refrigerant circuit (20). Specifically, the compression efficiency ($\eta 1$) in the single-stage compression operation gradually decreases as the required capacity (Q) of the refrigerant circuit (20) deviates from the required capacity corresponding to a maximum point of the compression efficiency ($\eta 1$) in the single-stage compression operation. Likewise, the compression efficiency ($\eta 2$) in the two-stage compression operation changes in accordance with the required capacity (Q) of the refrigerant circuit (20). Specifically, the compression efficiency ($\eta 2$) in the two-stage compression operation gradually decreases as the required capacity (Q) of the refrigerant circuit (20) deviates from the required capacity corresponding to a maximum point of the compression efficiency ($\eta 2$) in the two-stage compression operation. The required capacity (Q) of the refrigerant circuit (20) corresponding to the maximum point of the compression efficiency ($\eta 2$) in the two-stage compression operation is greater than the required capacity (Q) of the refrigerant circuit (20) corresponding to the maximum point of the compression efficiency ($\eta 1$) in the single-stage compression operation.

As illustrated in FIG. 2, a single-stage compression characteristic curve, which indicates changes in the compression efficiency ($\eta 1$) in the single-stage compression operation based on changes in the required capacity (Q) of the refrigerant circuit (20), crosses a two-stage compression characteristic curve, which indicates changes in the compression efficiency ($\eta 2$) in the two-stage compression operation based on changes in the required capacity (Q) of the refrigerant circuit (20). The required capacity corresponding to an intersection point of the single-stage compression characteristic curve and the two-stage compression characteristic curve (a boundary required capacity (Qk)) is the required capacity (Q) of the refrigerant circuit (20) at a boundary at which the compression efficiency ($\eta 2$) in the two-stage compression operation becomes higher than the compression efficiency ($\eta 1$) in the single-stage compression operation. If the required capacity (Q) of the refrigerant circuit (20) is below the boundary required capacity (Qk), the compression efficiency ($\eta 1$) in the single-stage compression operation is higher than the compression efficiency ($\eta 2$) in the two-stage compression operation. On the other hand, if the required capacity (Q) of the refrigerant circuit (20) is not below the boundary required capacity (Qk), the compression efficiency ($\eta 2$) in the two-stage compression operation is higher than the compression efficiency ($\eta 1$) in the single-stage compression operation.

The boundary required capacity (Qk) changes in accordance with the difference between a high pressure and a low pressure in the refrigerant circuit (20). Specifically, the boundary required capacity (Qk) gradually decreases as the difference between a high pressure and a low pressure in the refrigerant circuit (20) increases.

[Derivation of Compression Efficiency]

Next, derivation of the compression efficiency in the refrigeration cycle device (10) will be described.

In the single-stage compression operation, one of the first compressor (21) and the second compressor (22) is stopped and the other is driven. Thus, the compression efficiency ($\eta 1$) in the single-stage compression operation can be regarded as the compression efficiency of the compressor in a driven state of the first compressor (21) and the second compressor (22) (in this example, the second compressor (22)).

In the two-stage compression operation, both the first compressor (21) and the second compressor (22) are driven. Thus, the compression efficiency ($\eta 2$) in the two-stage compression operation can be regarded as the compression efficiency corresponding to the compression efficiency of the first compressor (21) and the compression efficiency of the second compressor (22).

For example, the compression efficiency ($\eta 2$) in the two-stage compression operation can be derived on the basis of the following equation 1. In equation 1, "$\eta 21$" represents the compression efficiency of the first compressor (21), "$\eta 22$" represents the compression efficiency of the second compressor (22), "Z21" represents the theoretical input value of the first compressor (21), and "Z22" represents the theoretical input value of the second compressor (22).

[Math. 1]

$$\eta_2 = \frac{Z_{21} \times \eta_{21} + Z_{22} \times \eta_{22}}{Z_{21} + Z_{22}} \quad (1)$$

Alternatively, the compression efficiency ($\eta 2$) in the two-stage compression operation may be derived on the basis of the following equation 2. In equation 2, "$\Delta P21$" represents the differential pressure of the first compressor (21) (the pressure difference between the discharge side and the suction side), "$\Delta P22$" represents the differential pressure of the second compressor (22), and "$\Delta P20$" represents the total differential pressure of the first compressor (21) and the second compressor (22) (specifically, the pressure difference between the suction side of the first compressor (21) and the discharge side of the second compressor (22)). "A" and "B" represent correction coefficients and are derived from volume rates, design differential pressures, or the like of the first compressor (21) and the second compressor (22).

[Math. 2]

$$\eta_2 = A \times \frac{\Delta P_{21}}{\Delta P_{20}} \times \eta_{21} + B \times \frac{\Delta P_{22}}{\Delta P_{20}} \times \eta_{22} \quad (2)$$

Alternatively, the compression efficiency ($\eta 2$) in the two-stage compression operation may be derived on the basis of the following equation 3. In equation 3, "Pr21" represents the compression ratio of the first compressor (21), "Pr22" represents the compression ratio of the second compressor (22), and "Pr20" represents the total compression ratio of the first compressor (21) and the second compressor (22) (specifically, the product of the compression ratio of the first compressor (21) and the compression ratio of the second compressor (22)). "C" and "D" represent correction coefficients and are derived from volume rates, design differential pressures, or the like of the first compressor (21) and the second compressor (22).

[Math. 3]

$$\eta_2 = C \times \frac{Pr_{21}}{Pr_{20}} \times \eta_{21} + D \times \frac{Pr_{22}}{Pr_{20}} \times \eta_{22} \quad (3)$$

Alternatively, the compression efficiency ($\eta 2$) in the two-stage compression operation may be derived on the basis of the following equation 4.

[Math. 4]

$$\eta_2 = \frac{\eta_{21} + \eta_{22}}{2} \quad (4)$$

The compression efficiency ($\eta 21$) of the first compressor (21) is derived, for example, on the basis of a prepared first compression efficiency map. In the first compression efficiency map, operation conditions (for example, a condensation pressure, an evaporation pressure, a degree of superheating, and so forth) of the refrigerant circuit (20) and the compression efficiency ($\eta 21$) of the first compressor (21) are associated with each other. Likewise, the compression efficiency ($\eta 22$) of the second compressor (22) is derived, for example, on the basis of a prepared second compression efficiency map. In the second compression efficiency map, operation conditions (for example, a condensation pressure, an evaporation pressure, a degree of superheating, and so forth) of the refrigerant circuit (20) and the compression efficiency ($\eta 22$) of the second compressor (22) are associated with each other.

The control unit (100) may derive the compression efficiency ($\eta 1$) in the single-stage compression operation and the compression efficiency ($\eta 2$) in the two-stage compression operation in the following manner. For example, the control unit (100) stores the first compression efficiency map and the second compression efficiency map. The control unit (100) periodically acquires the operation conditions of the refrigerant circuit (20) detected by the various sensors (not illustrated) provided in the refrigeration cycle device (10), and derives the compression efficiency ($\eta 1$) in the single-stage compression operation and the compression efficiency ($\eta 2$) in the two-stage compression operation on the basis of the acquired operation conditions of the refrigerant circuit (20), the first compression efficiency map, and the second compression efficiency map.

Specifically, the control unit (100) selects, of the first compression efficiency map and the second compression efficiency map, the compression efficiency map corresponding to the compressor that is in a driven state in the single-stage compression operation (in this example, the second compression efficiency map corresponding to the second compressor (22)). Subsequently, the control unit (100) selects, from the selected compression efficiency map, the compression efficiency of the compressor corresponding to the operation conditions of the refrigerant circuit (20) (in this example, the compression efficiency ($\eta$22) of the second compressor (22)), and sets the compression efficiency of the compressor as the compression efficiency ($\eta$1) in the single-stage compression operation. In addition, the control unit (100) selects, from the first compression efficiency map and the second compression efficiency map, the compression efficiency ($\eta$21) of the first compressor (21) and the compression efficiency ($\eta$22) of the second compressor (22) corresponding to the operation conditions of the refrigerant circuit (20), respectively. Subsequently, the control unit (100) substitutes the compression efficiency ($\eta$21) of the first compressor (21) and the compression efficiency ($\eta$22) of the second compressor (22) that have been selected into any one of equations 1 to 4 given above, thereby deriving the compression efficiency ($\eta$2) in the two-stage compression operation.

The compression efficiency ($\eta$2) in the two-stage compression operation may be derived by using a method other than equations 1 to 4 given above. The compression efficiency ($\eta$21) of the first compressor (21) and the compression efficiency ($\eta$22) of the second compressor (22) may be calculated on the basis of the states of the first compressor (21) and the second compressor (22) instead of using the first compression efficiency map and the second compression efficiency map.

[Operation Control]

Figure 3:
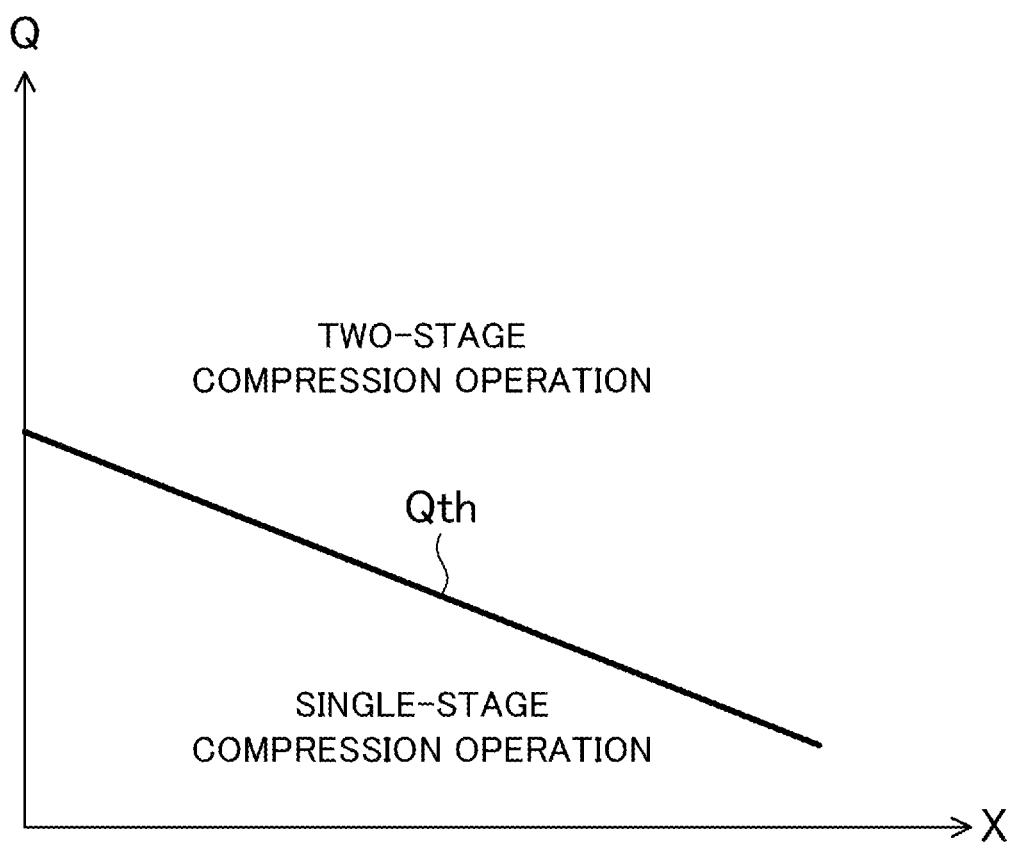
FIG. 3 is a graph for describing operation control of the refrigeration cycle device of Embodiment 1.

Next, operation control of the refrigeration cycle device (10) of Embodiment 1 will be described with reference to FIG. 3. The control unit (100) controls the refrigerant circuit (20) so that, of the single-stage compression operation and the two-stage compression operation, an operation with a higher compression efficiency is performed. Specifically, the control unit (100) compares the required capacity (Q) of the refrigerant circuit (20) with a predetermined capacity threshold (Qth). If the required capacity (Q) of the refrigerant circuit (20) is below the capacity threshold (Qth), the control unit (100) controls the refrigerant circuit (20) so that the single-stage compression operation is performed. On the other hand, if the required capacity (Q) of the refrigerant circuit (20) is not below the capacity threshold (Qth), the control unit (100) controls the refrigerant circuit (20) so that the two-stage compression operation is performed.

[Capacity Threshold]

The capacity threshold (Qth) is a value that changes in accordance with a physical quantity (X) correlated with the difference between a high pressure and a low pressure in the refrigerant circuit (20). The capacity threshold (Qth) corresponds to the required capacity (Q) of the refrigerant circuit (20) at a boundary at which the compression efficiency ($\eta$2) in the two-stage compression operation becomes higher than the compression efficiency ($\eta$1) in the single-stage compression operation under a condition that the physical quantity (X) is a physical quantity (X) corresponding to the capacity threshold (Qth). The capacity threshold (Qth) corresponds to the boundary required capacity (Qk) illustrated in FIG. 2. Specifically, the capacity threshold (Qth) is the required capacity (Q) of the refrigerant circuit (20) corresponding to the intersection point of the single-stage compression characteristic curve and the two-stage compression characteristic curve illustrated in FIG. 2. For example, when the capacity threshold (Qth) corresponding to a certain physical quantity (X) is selected from a line indicating changes in the capacity threshold (Qth) based on changes in the physical quantity (X) (the line of the capacity threshold (Qth) illustrated in FIG. 3), the selected capacity threshold (Qth) is the boundary required capacity (Qk) when the physical quantity (X) is the certain physical quantity (X) (the required capacity (Q) of the refrigerant circuit (20) at a boundary at which the compression efficiency ($\eta$2) in the two-stage compression operation becomes higher than the compression efficiency ($\eta$1) in the single-stage compression operation).

In this example, the capacity threshold (Qth) gradually decreases as the physical quantity (X) increases. In this example, the line indicating changes in the capacity threshold (Qth) based on changes in the physical quantity (X) is a straight line.

[Specific Example of Physical Quantity]

Next, the physical quantity (X) will be described. As described above, the physical quantity (X) is a quantity correlated with the difference between a high pressure and a low pressure in the refrigerant circuit (20).

Examples of a quantity correlated with a high pressure in the refrigerant circuit (20) include the following nine parameters.

(1) Discharge pressure: the pressure of refrigerant discharged by the compression mechanism constituted by the first compressor (21) and the second compressor (22)

(2) Discharge temperature: the temperature of refrigerant discharged by the compression mechanism (3) Condensation pressure: the condensation pressure of refrigerant in a heat exchanger serving as a condenser of the heat-source-side heat exchanger (24) and the use-side heat exchanger (27)

(4) Condensation temperature: the condensation temperature of refrigerant in a heat exchanger serving as a condenser (5) High pressure: a high pressure detected by a refrigerant pressure sensor (not illustrated)

(6) Hot-water discharge temperature: the temperature of water that flows out of the use-side heat exchanger (27) in a heating operation when the use-side heat exchanger (27) causes refrigerant and water to exchange heat with each other (7) Heating blow-out temperature: the temperature of air that flows out of the use-side heat exchanger (27) in a heating operation when the use-side heat exchanger (27) causes refrigerant and air (one example of a use-side fluid) to exchange heat with each other (8) Heating intake temperature: the temperature of air that flows into the use-side heat exchanger (27) in a heating operation when the use-side heat exchanger (27) causes refrigerant and air (one example of a use-side fluid) to exchange heat with each other (9) Cooling outside air temperature: the temperature of air that flows into the heat-source-side heat exchanger (24) in a cooling operation when the heat-source-side heat exchanger (24) causes refrigerant and air to exchange heat with each other The foregoing parameters correlated with a high pressure in the refrigerant circuit (20) can be acquired by the various sensors provided in the refrigeration cycle device (10).

Examples of a quantity correlated with a low pressure in the refrigerant circuit (20) include the following nine parameters.

(1) Suction pressure: the pressure of refrigerant sucked by the compression mechanism constituted by the first compressor (21) and the second compressor (22)

(2) Suction temperature: the temperature of refrigerant sucked by the compression mechanism (3) Evaporation pressure: the evaporation pressure of refrigerant in a heat exchanger serving as an evaporator of the heat-source-side heat exchanger (24) and the use-side heat exchanger (27)

(4) Evaporation temperature: the evaporation temperature of refrigerant in a heat exchanger serving as an evaporator (5) Low pressure: a low pressure detected by a refrigerant pressure sensor (not illustrated)

(6) Cooling-water temperature: the temperature of water that flows out of the use-side heat exchanger (27) in a cooling operation when the use-side heat exchanger (27) causes refrigerant and water to exchange heat with each other (7) Cooling blow-out temperature: the temperature of air that flows out of the use-side heat exchanger (27) in a cooling operation when the use-side heat exchanger (27) causes refrigerant and air to exchange heat with each other (8) Cooling intake temperature: the temperature of air that flows into the use-side heat exchanger (27) in a cooling operation when the use-side heat exchanger (27) causes refrigerant and air to exchange heat with each other (9) Heating outside air temperature: the temperature of air that flows into the heat-source-side heat exchanger (24) in a heating operation when the heat-source-side heat exchanger (24) causes refrigerant and air to exchange heat with each other The foregoing parameters correlated with a low pressure in the refrigerant circuit (20) can be acquired by the various sensors provided in the refrigeration cycle device (10).

From the above, it is possible to use, as the physical quantity (X), (1) the difference between a discharge pressure and a suction pressure, (2) the difference between a discharge temperature and a suction temperature, (3) the difference between a condensation pressure and an evaporation pressure, (4) the difference between a condensation temperature and an evaporation temperature, (5) the difference between a high pressure and a low pressure, (6) the difference between a hot-water discharge temperature and a heating outside air temperature, (7) the difference between a cooling outside air temperature and a cooling-water temperature, (8) the difference between a heating blow-out temperature and a heating outside air temperature, (9) the difference between a heating intake temperature and a heating outside air temperature, (10) the difference between a cooling outside air temperature and a cooling blow-out temperature, (11) the difference between a cooling outside air temperature and a cooling intake temperature, and the like, for example.

Feature (1) of Embodiment 1

The refrigeration cycle device (10) of the present embodiment includes the refrigerant circuit (20) including the first compressor (21), the second compressor (22), the heat-source-side heat exchanger (24), the expansion mechanism (26), and the use-side heat exchanger (27), and capable of performing a single-stage compression operation in which one of the first compressor (21) and the second compressor (22) is driven and the other is stopped, and a two-stage compression operation in which both the first compressor (21) and the second compressor (22) are driven; and the control unit (100) configured to control the refrigerant circuit (20) so that the single-stage compression operation is performed if the required capacity (Q) of the refrigerant circuit (20) is below the predetermined capacity threshold (Qth), and control the refrigerant circuit (20) so that the two-stage compression operation is performed if the required capacity (Q) of the refrigerant circuit (20) is not below the capacity threshold (Qth). The capacity threshold (Qth) is a value that changes in accordance with the physical quantity (X) correlated with the difference between a high pressure and a low pressure in the refrigerant circuit (20), and corresponds to the required capacity (Q) of the refrigerant circuit (20) at a boundary at which the compression efficiency ($\eta 2$) in the two-stage compression operation becomes higher than the compression efficiency ($\eta 1$) in the single-stage compression operation under a condition that the physical quantity (X) is a physical quantity (X) corresponding to the capacity threshold (Qth).

In the present embodiment, switching between the single-stage compression operation and the two-stage compression operation can be performed in consideration of a boundary at which the compression efficiency in the two-stage compression operation becomes higher than the compression efficiency in the single-stage compression operation. Accordingly, the compression efficiency in the refrigeration cycle device (10) can be improved.

In more detail, in the single-stage compression operation, energy loss caused by driving a compressor (for example, pressure loss in a suction pipe and a discharge pipe of the compressor, heat loss in the compressor, or the like) can be reduced compared to the two-stage compression operation. On the other hand, in the two-stage compression operation, a differential pressure per compressor (a pressure difference between a suction side and a discharge side of the compressor) can be reduced and a compression efficiency per compressor can be easily improved compared to the single-stage compression operation. When the difference between a high pressure and a low pressure in the refrigerant circuit (20) is relatively small, improvement in compression efficiency resulting from the above-described reduction of energy loss tends to be more effective than improvement in compression efficiency resulting from the above-described reduction of a differential pressure per compressor. In other words, when the difference between a high pressure and a low pressure in the refrigerant circuit (20) is relatively small, the compression efficiency in the single-stage compression operation tends to be higher than the compression efficiency in the two-stage compression operation. On the other hand, when the difference between a high pressure and a low pressure in the refrigerant circuit (20) is relatively large, improvement in compression efficiency resulting from the above-described reduction of a differential pressure per compressor tends to be more effective than improvement in compression efficiency resulting from the above-described reduction of energy loss. In other words, when the difference between a high pressure and a low pressure in the refrigerant circuit (20) is relatively large, the compression efficiency in the two-stage compression operation tends to be higher than the compression efficiency in the single-stage compression operation.

The total thermal insulation efficiency of each of the first compressor (21) and the second compressor (22) changes in accordance with the number of rotations of the compressor.

Specifically, the total thermal insulation efficiency of a compressor gradually decreases as the number of rotations of the compressor deviates from the number of rotations corresponding to a maximum point of the total thermal insulation efficiency of the compressor. The volume efficiency of each of the first compressor (21) and the second compressor (22) tends to be directly proportional to the number of rotations of the compressor. The number of rotations of each of the first compressor (21) and the second compressor (22) depends on the required capacity (Q) of the refrigerant circuit (20) (the capacity required for the refrigerant circuit (20)). In other words, a change in the required capacity (Q) of the refrigerant circuit (20) causes a change in the number of rotations of at least one of the first compressor (21) and the second compressor (22).

Thus, as a result of switching between the single-stage compression operation and the two-stage compression operation in accordance with the physical quantity (X) correlated with the difference between a high pressure and a low pressure in the refrigerant circuit (20) and the required capacity (Q) of the refrigerant circuit (20), switching between the single-stage compression operation and the two-stage compression operation can be performed in consideration of a boundary at which the compression efficiency in the two-stage compression operation becomes higher than the compression efficiency in the single-stage compression operation.

When the body structure (for example, a cylinder volume rate, a design compression ratio, or the like) of the first compressor (21) is different from the body structure of the second compressor (22), the number of rotations of the first compressor (21) and the number of rotations of the second compressor (22) are different from each other. Thus, particularly when the body structure of the first compressor (21) is different from the body structure of the second compressor (22), the compression efficiency in the refrigeration cycle device (10) can be appropriately improved by switching between the single-stage compression operation and the two-stage compression operation in accordance with the required capacity (Q) of the refrigerant circuit (20) depending on the number of rotations of each of the first compressor (21) and the second compressor (22) and the physical quantity (X).

Feature (2) of Embodiment 1

In the refrigeration cycle device (10) of the present embodiment, the capacity threshold (Qth) gradually decreases as the physical quantity (X) increases.

In the present embodiment, switching between the single-stage compression operation and the two-stage compression operation can be appropriately performed in consideration of a boundary at which the compression efficiency in the two-stage compression operation becomes higher than the compression efficiency in the single-stage compression operation.

In more detail, as a result of gradually decreasing the capacity threshold (Qth) as the physical quantity (X) correlated with a high pressure and a low pressure in the refrigerant circuit (20) increases, the single-stage compression operation can be performed if the difference between a high pressure and a low pressure in the refrigerant circuit (20) is relatively small, and the two-stage compression operation can be performed if the difference between a high pressure and a low pressure in the refrigerant circuit (20) is relatively large. As a result of performing the single-stage compression operation if the difference between a high pressure and a low pressure in the refrigerant circuit (20) is relatively small, the compression efficiency can be appropriately improved by reducing energy loss caused by driving of the compressor. As a result of performing the two-stage compression operation if the difference between a high pressure and a low pressure in the refrigerant circuit (20) is relatively large, the compression efficiency can be appropriately improved by reducing a differential pressure per compressor.

Feature (3) of Embodiment 1

The refrigeration cycle device (10) of the present embodiment includes the injection circuit (30). The second compressor (22) sucks refrigerant discharged by the first compressor (21) in the two-stage compression operation, and the injection circuit (30) supplies, to the suction side of the second compressor (22), part of refrigerant flowing from, of the heat-source-side heat exchanger (24) and the use-side heat exchanger (27), a heat exchanger serving as a radiator toward the expansion mechanism (26) in the two-stage compression operation.

In the present embodiment, in the two-stage compression operation, part of refrigerant flowing from a heat exchanger serving as a radiator (the heat-source-side heat exchanger (24) or the use-side heat exchanger (27)) toward the expansion mechanism (26) is supplied to the suction side of the second compressor (22), and thus the refrigerant sucked by the second compressor (22) can be cooled. Accordingly, the enthalpy of the refrigerant sucked by the second compressor (22) can be decreased. Thus, the theoretical power of the second compressor (22) can be reduced, and the operation efficiency (for example, a coefficient of performance (COP)) of the refrigeration cycle device (10) can be increased.

In the present embodiment, an increase in the temperature of the refrigerant discharged by the second compressor (22) (hereinafter referred to as a "discharge temperature") can be suppressed. Accordingly, the second compressor (22) can be protected against breakdown from a high temperature, and thus the reliability of the second compressor (22) can be secured. Because the density of the refrigerant sucked by the second compressor (22) can be increased, the mechanical efficiency of the second compressor (22) can be increased.

Modification Example of Embodiment 1

Figure 4:
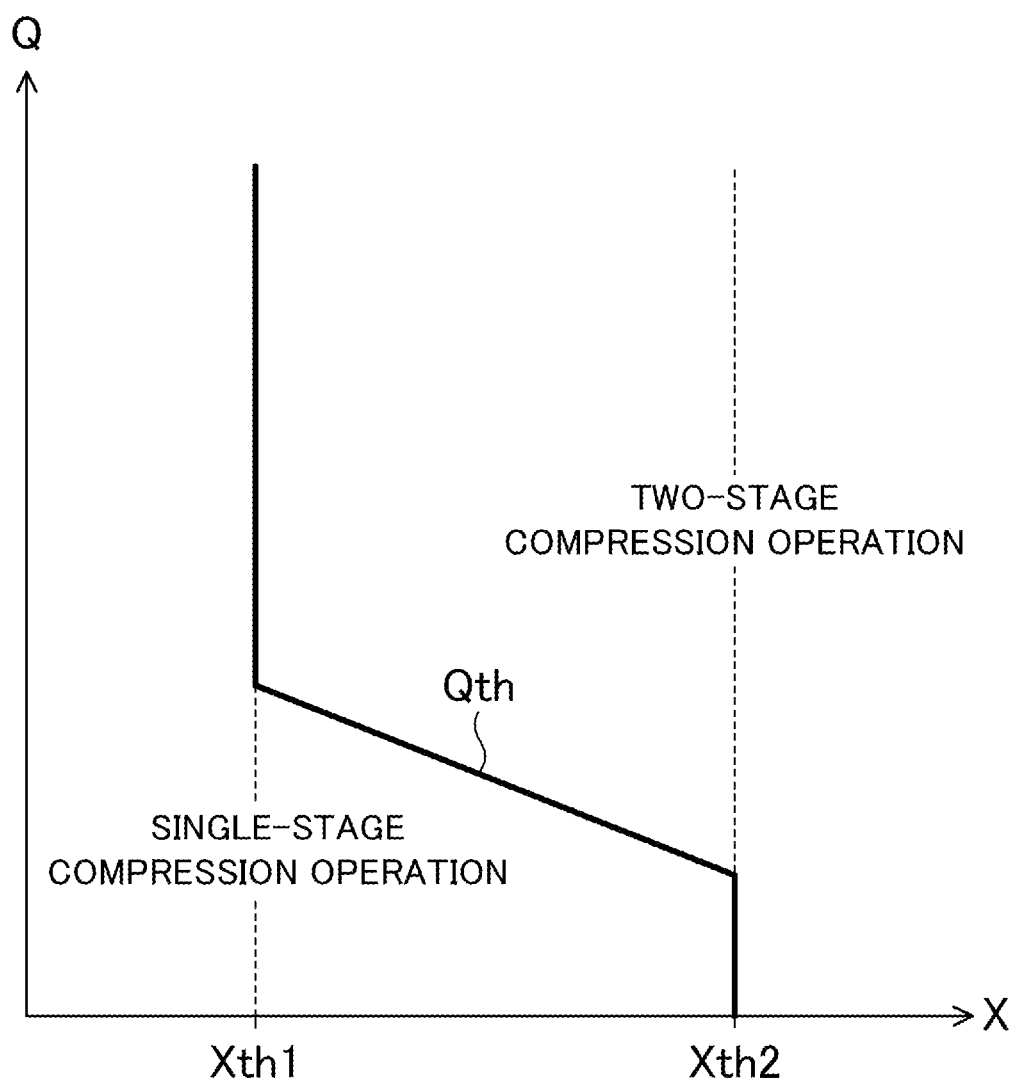
FIG. 4 is a graph for describing switching of operation of the refrigeration cycle device of a modification example of Embodiment 1.

As illustrated in FIG. 4, in a modification example of Embodiment 1, the control unit (100) controls the refrigerant circuit (20) so that the single-stage compression operation is performed regardless of the required capacity (Q) of the refrigerant circuit (20) if the physical quantity (X) is below a predetermined first physical quantity threshold (Xth1). The control unit (100) controls the refrigerant circuit (20) so that the two-stage compression operation is performed regardless of the required capacity (Q) of the refrigerant circuit (20) if the physical quantity (X) is above a predetermined second physical quantity threshold (Xth2). The second physical quantity threshold (Xth2) is greater than the first physical quantity threshold (Xth1).

If the physical quantity (X) is not below the first physical quantity threshold (Xth1) and is not above the second physical quantity threshold (Xth2), the control unit (100) controls the refrigerant circuit (20) so that either one of the single-stage compression operation and the two-stage compression operation is performed in accordance with a result of comparison between the physical quantity (X) and the capacity threshold (Qth).

Feature of Modification Example of Embodiment 1

In the refrigeration cycle device (10) of the present embodiment, the control unit (100) controls the refrigerant circuit (20) so that the single-stage compression operation is performed regardless of the required capacity (Q) of the refrigerant circuit (20) if the physical quantity (X) is below the predetermined first physical quantity threshold (Xth1), and controls the refrigerant circuit (20) so that the two-stage compression operation is performed regardless of the required capacity (Q) of the refrigerant circuit (20) if the physical quantity (X) is above the second physical quantity threshold (Xth2) that is greater than the first physical quantity threshold (Xth1).

In the present embodiment, as a result of controlling the refrigerant circuit (20) so that the single-stage compression operation is performed regardless of the required capacity (Q) of the refrigerant circuit (20) if the physical quantity (X) is below the first physical quantity threshold (Xth1), execution of the two-stage compression operation can be prohibited when the difference between a high pressure and a low pressure in the refrigerant circuit (20) is too small and it is impossible to execute the two-stage compression operation. Accordingly, the occurrence of a malfunction resulting from the execution of the two-stage compression operation can be avoided. For example, in one or both of the first compressor (21) and the second compressor (22), the occurrence of startup failure, insufficient oil supply, bearing damage, or the like caused by an insufficient differential pressure of the compressor or compressors can be avoided.

In the present embodiment, as a result of controlling the refrigerant circuit (20) so that the two-stage compression operation is performed regardless of the required capacity (Q) of the refrigerant circuit (20) if the physical quantity (X) is above the second physical quantity threshold (Xth2), execution of the single-stage compression operation can be prohibited when the difference between a high pressure and a low pressure in the refrigerant circuit (20) is too large and it is impossible to execute the single-stage compression operation. Accordingly, the occurrence of a malfunction resulting from the execution of the single-stage compression operation can be avoided. For example, in one or both of the first compressor (21) and the second compressor (22), the occurrence of startup failure, bearing damage, insufficient capacity, a decrease in compression efficiency, or the like caused by an excessive differential pressure of the compressor or compressors can be avoided.

Embodiment 2

Figure 5:
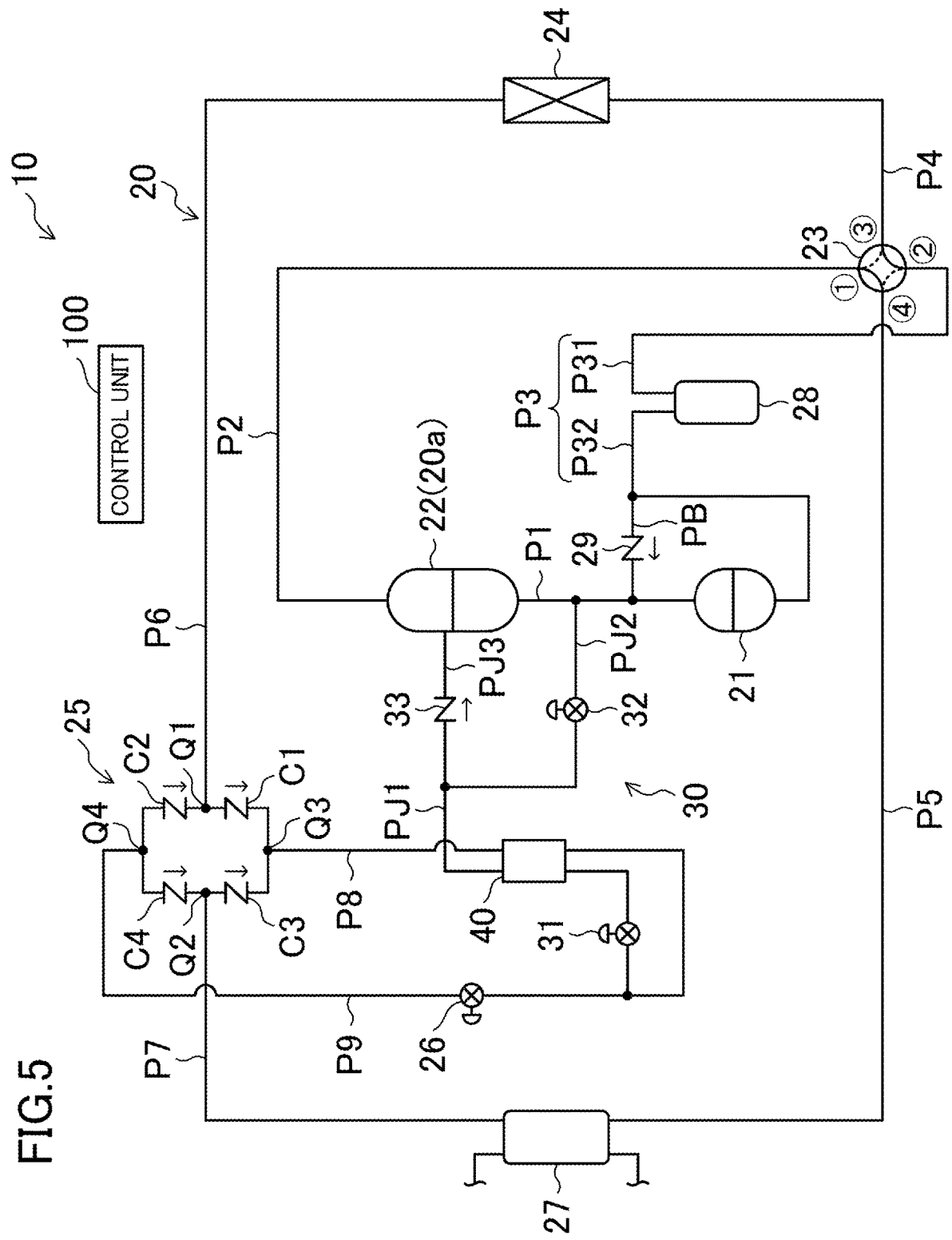
FIG. 5 is a piping diagram illustrating the configuration of a refrigeration cycle device of Embodiment 2.

FIG. 5 illustrates the configuration of a refrigeration cycle device (10) of Embodiment 2. The refrigeration cycle device (10) of Embodiment 2 is different from the refrigeration cycle device (10) of Embodiment 1 in the configuration of the second compressor (22) and the configuration of the injection circuit (30). Other than that, the configuration of the refrigeration cycle device (10) of Embodiment 2 is similar to the configuration of the refrigeration cycle device (10) of Embodiment 1.

[Injection Compressor]

In Embodiment 2, one of the first compressor (21) and the second compressor (22) is an injection compressor (20a). The injection compressor (20a) includes a compression chamber for compressing refrigerant, and is configured to be able to supply refrigerant to the compression chamber that is performing compression. Specifically, the injection compressor (20a) is provided with a suction port, an intermediate port, and a discharge port. The suction port communicates with the compression chamber (a low-pressure compression chamber) in a suction process of the injection compressor (20a). The intermediate port communicates with the compression chamber (an intermediate-pressure compression chamber) in a compression process of the injection compressor (20a). The discharge port communicates with the compression chamber (a high-pressure compression chamber) in a discharge process of the injection compressor (20a). In this example, the second compressor (22) is the injection compressor (20a).

[Injection Circuit]

In Embodiment 2, the injection circuit (30) can be switched among a first state, a second state, a third state, and a fourth state. In this example, the injection circuit (30) is switched between the first state and the second state in the single-stage compression operation, and is switched between the third state and the fourth state in the two-stage compression operation. In addition, the injection circuit (30) is switched between the first state (or the second state) in the single-stage compression operation and the third state (or the fourth state) in the two-stage compression operation.

In the first state, the injection circuit (30) does not supply, to either of the suction side of the second compressor (22) and the compression chamber performing compression of the injection compressor (20a) (in this example, the second compressor (22)), part of refrigerant flowing from, of the heat-source-side heat exchanger (24) and the use-side heat exchanger (27), a heat exchanger serving as a condenser (radiator) toward the expansion mechanism (26).

In the second state, the injection circuit (30) supplies, to the compression chamber performing compression of the injection compressor (20a) (in this example, the second compressor (22)), part of refrigerant flowing from, of the heat-source-side heat exchanger (24) and the use-side heat exchanger (27), a heat exchanger serving as a condenser (radiator) toward the expansion mechanism (26).

In the third state, the injection circuit (30) supplies, to the suction side of the second compressor (22), part of refrigerant flowing from, of the heat-source-side heat exchanger (24) and the use-side heat exchanger (27), a heat exchanger serving as a condenser (radiator) toward the expansion mechanism (26).

In the fourth state, the injection circuit (30) supplies, to both the suction side of the second compressor (22) and the compression chamber performing compression of the injection compressor (20a) (in this example, the second compressor (22)), part of refrigerant flowing from, of the heat-source-side heat exchanger (24) and the use-side heat exchanger (27), a heat exchanger serving as a condenser (radiator) toward the expansion mechanism (26).

Specifically, in this example, the injection circuit (30) includes a decompression valve (32) and an injection check valve (33) in addition to the injection expansion valve (31). The injection circuit (30) is provided with a second injection pipe (PJ2) and a third injection pipe (PJ3) in addition to the first injection pipe (PJ1). The second injection pipe (PJ2) connects the other end of the first injection pipe (PJ1) and a midway portion of the first refrigerant pipe (P1). The third injection pipe (PJ3) connects the other end of the first injection pipe (PJ1) and the intermediate port of the second compressor (22), which is the injection compressor (20a). The second injection pipe (PJ2) is provided with the decompression valve (32). The third injection pipe (PJ3) is provided with the injection check valve (33).

The decompression valve (32) is capable of adjusting the opening degree thereof. For example, the decompression valve (32) is constituted by an electric valve. The injection check valve (33) allows a flow of refrigerant flowing from the first injection pipe (PJ1) toward the intermediate port of the second compressor (22), which is the injection compressor (20a), and checks a flow of refrigerant in the opposite direction. The injection check valve (33) may be provided in the second compressor (22), which is the injection compressor (20a).

In this example, the injection circuit (30) is brought into the first state (the state in which part of the refrigerant is not supplied to either of the suction side of the second compressor (22) and the compression chamber performing compression of the injection compressor (20a)) by bringing the injection expansion valve (31) into a fully closed state. The injection circuit (30) is brought into the second state (the state in which part of the refrigerant is supplied to the compression chamber performing compression of the injection compressor (20a)) by bringing the injection expansion valve (31) into an adjustment state (the state in which the opening degree is adjusted as appropriate) and bringing the decompression valve (32) into a fully opened state.

The injection circuit (30) is brought into the third state (the state in which part of the refrigerant is supplied to the suction side of the second compressor (22)) by bringing the injection expansion valve (31) into an adjustment state and bringing the decompression valve (32) into a fully closed state. The injection circuit (30) is brought into the fourth state (the state in which part of the refrigerant is supplied to both the suction side of the second compressor (22) and the compression chamber performing compression of the injection compressor (20a)) by bringing the injection expansion valve (31) into an adjustment state and bringing the decompression valve (32) into a state between a fully closed state and a fully opened state.

[Operation of Refrigeration Cycle Device]

In the refrigeration cycle device (10) of Embodiment 2, as in the refrigeration cycle device (10) of Embodiment 1, the single-stage compression operation and the two-stage compression operation are performed. A single-stage compression heating operation and a single-stage compression cooling operation are performed as the single-stage compression operation, and a two-stage compression heating operation and a two-stage compression cooling operation are performed as the two-stage compression operation.

<Single-Stage Compression Operation>

The single-stage compression operation (the single-stage compression heating operation and the single-stage compression cooling operation) of Embodiment 2 is different from the single-stage compression operation (the single-stage compression heating operation and the single-stage compression cooling operation) of Embodiment 1 in terms of the operation of the injection circuit (30). In the single-stage compression operation of Embodiment 2, part of refrigerant flowing through the eighth refrigerant pipe (P8) by passing through the check valve bridge (25) and the intermediate heat exchanger (40) in order from, of the heat-source-side heat exchanger (24) and the use-side heat exchanger (27), a heat exchanger serving as a condenser (radiator), is supplied to the injection circuit (30) in accordance with the state of the injection circuit (30).

When the injection circuit (30) is in the first state (specifically, when the injection expansion valve (31) is in a fully closed state), the refrigerant flowing through the eighth refrigerant pipe (P8) is not supplied to the injection circuit (30) but is supplied to the expansion mechanism (26).

When the injection circuit (30) is in the second state (specifically, when the injection expansion valve (31) is in an adjustment state and the decompression valve (32) is in a fully closed state), part of refrigerant flowing through the eighth refrigerant pipe (P8) is supplied to the first injection pipe (PJ1) of the injection circuit (30), and the remaining part thereof is supplied to the expansion mechanism (26). The refrigerant supplied to the injection circuit (30) flows through the first injection pipe (PJ1), is decompressed by the injection expansion valve (31), and absorbs heat from the refrigerant flowing through the eighth refrigerant pipe (P8) in the intermediate heat exchanger (40). The refrigerant flowed out of the intermediate heat exchanger (40) and flowing through the first injection pipe (PJ1) passes through the injection check valve (33) and is supplied to the intermediate port of the second compressor (22), which is the injection compressor (20a). The refrigerant supplied to the intermediate port of the second compressor (22) is supplied to the compression chamber performing compression of the second compressor (22) and is mixed with the refrigerant in the compression chamber. Accordingly, the refrigerant in the compression chamber of the second compressor (22) is cooled.

<Two-Stage Compression Operation>

The two-stage compression operation (the two-stage compression heating operation and the two-stage compression cooling operation) of Embodiment 2 is different from the two-stage compression operation (the two-stage compression heating operation and the two-stage compression cooling operation) of Embodiment 1 in terms of the operation of the injection circuit (30). In the two-stage compression operation of Embodiment 2, the refrigerant flowed out of the intermediate heat exchanger (40) and flowing through the first injection pipe (PJ1) is supplied to the suction side of the second compressor (22) or to both the suction side of the second compressor (22) and the compression chamber performing compression of the injection compressor (20a) (in this example, the second compressor (22)) in accordance with the state of the injection circuit (30).

When the injection circuit (30) is in the third state (specifically, when the injection expansion valve (31) is in an adjustment state and the decompression valve (32) is in a fully opened state), the refrigerant flowing through the first injection pipe (PJ1) passes through the decompression valve (32) in an opened state and is supplied to a midway portion of the first refrigerant pipe (P1). The refrigerant supplied to the first refrigerant pipe (P1) joins the refrigerant discharged by the first compressor (21), and is sucked and compressed by the second compressor (22). Accordingly, the refrigerant sucked by the second compressor (22) is cooled.

When the injection circuit (30) is in the fourth state (specifically, when the injection expansion valve (31) is in an adjustment state and the decompression valve (32) is in a state between a fully closed state and a fully opened state), the refrigerant flowing through the first injection pipe (PJ1) passes through injection check valve (33) and is supplied to the intermediate port of the second compressor (22), which is the injection compressor (20a). The refrigerant supplied to the intermediate port of the second compressor (22) is supplied to the compression chamber performing compression of the second compressor (22) and is mixed with the refrigerant in the compression chamber. Accordingly, the refrigerant in the compression chamber of the second compressor (22) is cooled.

[Description of Compression Efficiency]

Next, the compression efficiency in the refrigeration cycle device (10) of Embodiment 2 will be described. In the refrigeration cycle device (10) of Embodiment 2, the compression efficiency in the single-stage compression operation when the injection circuit (30) is in the first state (hereinafter referred to as a "first single-stage compression operation"), the compression efficiency in the single-stage compression operation when the injection circuit (30) is in the second state (hereinafter referred to as a "second single-stage compression operation"), and the compression efficiency in the two-stage compression operation when the injection circuit (30) is in the third state (hereinafter referred to as a "first two-stage compression operation") are taken into consideration.

<Relationship Between First Single-Stage Compression Operation and Second Single-Stage Compression Operation>

First, the relationship between the compression efficiency in the first single-stage compression operation and the compression efficiency in the second single-stage compression operation will be described. The relationship between the compression efficiency in the first single-stage compression operation and the compression efficiency in the second single-stage compression operation is similar to the relationship between the compression efficiency ($\eta 1$) in the single-stage compression operation and the compression efficiency ($\eta 2$) in the two-stage compression operation illustrated in FIG. 2. Specifically, the required capacity (Q) of the refrigerant circuit (20) corresponding to the maximum point of the compression efficiency in the second single-stage compression operation is greater than the required capacity (Q) of the refrigerant circuit (20) corresponding to the maximum point of the compression efficiency in the first single-stage compression operation.

A first single-stage compression characteristic curve (a curve similar to the curve of the compression efficiency ($\eta 2$) in FIG. 2), which indicates changes in the compression efficiency in the first single-stage compression operation based on changes in the required capacity (Q) of the refrigerant circuit (20), crosses a second single-stage compression characteristic curve (a curve similar to the curve of the compression efficiency ($\eta 1$) in FIG. 2), which indicates changes in the compression efficiency in the second single-stage compression operation based on changes in the required capacity (Q) of the refrigerant circuit (20). A boundary required capacity corresponding to an intersection point of the first single-stage compression characteristic curve and the second single-stage compression characteristic curve (a required capacity similar to the boundary required capacity (Qk) in FIG. 2) is the required capacity (Q) of the refrigerant circuit (20) at a boundary at which the compression efficiency in the second single-stage compression operation becomes higher than the compression efficiency in the first single-stage compression operation. If the required capacity (Q) of the refrigerant circuit (20) is below the boundary required capacity, the compression efficiency in the first single-stage compression operation is higher than the compression efficiency in the second single-stage compression operation. On the other hand, if the required capacity (Q) of the refrigerant circuit (20) is not below the boundary required capacity, the compression efficiency in the second single-stage compression operation is higher than the compression efficiency in the first single-stage compression operation.

The boundary required capacity changes in accordance with the difference between a high pressure and a low pressure in the refrigerant circuit (20). Specifically, the boundary required capacity gradually decreases as the difference between a high pressure and a low pressure in the refrigerant circuit (20) increases.

<Relationship Between First Single-Stage Compression Operation and First Two-Stage Compression Operation>

Next, the relationship between the compression efficiency in the first single-stage compression operation and the compression efficiency in the first two-stage compression operation will be described. The relationship between the compression efficiency in the first single-stage compression operation and the compression efficiency in the first two-stage compression operation is similar to the relationship between the compression efficiency ($\eta 1$) in the single-stage compression operation and the compression efficiency ($\eta 2$) in the two-stage compression operation illustrated in FIG. 2. Specifically, the required capacity (Q) of the refrigerant circuit (20) corresponding to the maximum point of the compression efficiency in the first two-stage compression operation is greater than the required capacity (Q) of the refrigerant circuit (20) corresponding to the maximum point of the compression efficiency in the first single-stage compression operation.

A first single-stage compression characteristic curve (a curve similar to the curve of the compression efficiency ($\eta 2$) in FIG. 2), which indicates changes in the compression efficiency in the first single-stage compression operation based on changes in the required capacity (Q) of the refrigerant circuit (20), crosses a first two-stage compression characteristic curve (a curve similar to the curve of the compression efficiency ($\eta 1$) in FIG. 2), which indicates changes in the compression efficiency in the first two-stage compression operation based on changes in the required capacity (Q) of the refrigerant circuit (20). A boundary required capacity corresponding to an intersection point of the first single-stage compression characteristic curve and the first two-stage compression characteristic curve (a required capacity similar to the boundary required capacity (Qk) in FIG. 2) is the required capacity (Q) of the refrigerant circuit (20) at a boundary at which the compression efficiency in the first two-stage compression operation becomes higher than the compression efficiency in the first single-stage compression operation. If the required capacity (Q) of the refrigerant circuit (20) is below the boundary required capacity, the compression efficiency in the first single-stage compression operation is higher than the compression efficiency in the first two-stage compression operation. On the other hand, if the required capacity (Q) of the refrigerant circuit (20) is not below the boundary required capacity, the compression efficiency in the first two-stage compression operation is higher than the compression efficiency in the first single-stage compression operation.

The boundary required capacity changes in accordance with the difference between a high pressure and a low pressure in the refrigerant circuit (20). Specifically, the boundary required capacity gradually decreases as the difference between a high pressure and a low pressure in the refrigerant circuit (20) increases.

<Relationship Between Second Single-Stage Compression Operation and First Two-Stage Compression Operation>

Next, the relationship between the compression efficiency in the second single-stage compression operation and the compression efficiency in the first two-stage compression operation will be described. The relationship between the compression efficiency in the second single-stage compression operation and the compression efficiency in the first two-stage compression operation is similar to the relationship between the compression efficiency ($\eta 1$) in the single-stage compression operation and the compression efficiency ($\eta 2$) in the two-stage compression operation illustrated in FIG. 2. Specifically, the required capacity (Q) of the refrigerant circuit (20) corresponding to the maximum point of the compression efficiency in the first two-stage compression operation is greater than the required capacity (Q) of the refrigerant circuit (20) corresponding to the maximum point of the compression efficiency in the second single-stage compression operation.

When the difference between a high pressure and a low pressure in the refrigerant circuit (20) is relatively small, a second single-stage compression characteristic curve (a curve similar to the curve of the compression efficiency ($\eta 2$) in FIG. 2), which indicates changes in the compression efficiency in the second single-stage compression operation based on changes in the required capacity (Q) of the refrigerant circuit (20), crosses a first two-stage compression characteristic curve (a curve similar to the curve of the compression efficiency ($\eta 1$) in FIG. 2), which indicates changes in the compression efficiency in the first two-stage compression operation based on changes in the required capacity (Q) of the refrigerant circuit (20). A boundary required capacity corresponding to an intersection point of the second single-stage compression characteristic curve and the first two-stage compression characteristic curve (a required capacity similar to the boundary required capacity (Qk) in FIG. 2) is the required capacity (Q) of the refrigerant circuit (20) at a boundary at which the compression efficiency in the first two-stage compression operation becomes higher than the compression efficiency in the second single-stage compression operation. If the required capacity (Q) of the refrigerant circuit (20) is below the boundary required capacity, the compression efficiency in the second single-stage compression operation is higher than the compression efficiency in the first two-stage compression operation. On the other hand, if the required capacity (Q) of the refrigerant circuit (20) is not below the boundary required capacity, the compression efficiency in the first two-stage compression operation is higher than the compression efficiency in the second single-stage compression operation.

The boundary required capacity changes in accordance with the difference between a high pressure and a low pressure in the refrigerant circuit (20). Specifically, the boundary required capacity gradually decreases as the difference between a high pressure and a low pressure in the refrigerant circuit (20) increases.

When the difference between a high pressure and a low pressure in the refrigerant circuit (20) increases and exceeds a predetermined difference (a boundary high-low pressure difference), the boundary required capacity becomes zero. In other words, the second single-stage compression characteristic curve and the first two-stage compression characteristic curve do not cross each other. Thus, when the difference between a high pressure and a low pressure in the refrigerant circuit (20) is above the boundary high-low pressure difference, the compression efficiency in the first two-stage compression operation is constantly higher than the compression efficiency in the second single-stage compression operation regardless of the required capacity (Q) of the refrigerant circuit (20). The boundary high-low pressure difference is the difference between a high pressure and a low pressure in the refrigerant circuit (20) at a boundary at which the compression efficiency in the first two-stage compression operation becomes constantly higher than the compression efficiency in the second single-stage compression operation regardless of the required capacity (Q) of the refrigerant circuit (20).

The boundary high-low pressure difference changes in accordance with the body structure (specifically, a cylinder volume rate or a design differential pressure) of a compressor constituted by the injection compressor (20a) of the first compressor (21) and the second compressor (22). For example, the boundary high-low pressure difference tends to gradually decrease as the body structure of the injection compressor (20a) reduces.

[Discharge Temperature of Second Compressor in Two-Stage Compression Operation]

Next, the discharge temperature of the second compressor (22) in the two-stage compression operation will be described. The discharge temperature of the second compressor (22) in the two-stage compression operation tends to increase as the difference between a high pressure and a low pressure in the refrigerant circuit (20) increases. Specifically, the required capacity (Q) of the refrigerant circuit (20) at a boundary at which the discharge temperature of the second compressor (22) becomes higher than a predetermined allowed discharge temperature in the first two-stage compression operation is defined as a "high-temperature boundary capacity threshold". In this case, the discharge temperature of the second compressor (22) in the first two-stage compression operation does not exceed the allowed discharge temperature if the required capacity (Q) of the refrigerant circuit (20) is below the high-temperature boundary capacity threshold, but the discharge temperature of the second compressor (22) in the first two-stage compression operation exceeds the allowed discharge temperature if the required capacity (Q) of the refrigerant circuit (20) is not below the high-temperature boundary capacity threshold. The high-temperature boundary capacity threshold gradually decreases as the difference between a high pressure and a low pressure in the refrigerant circuit (20) increases.

In the two-stage compression operation when the injection circuit (30) is in the fourth state (hereinafter "second two-stage compression operation"), an increase in the discharge temperature of the second compressor (22) can be suppressed compared to the first two-stage compression operation. Thus, as a result of performing the second two-stage compression operation instead of the first two-stage compression operation if the required capacity (Q) of the refrigerant circuit (20) is not below the high-temperature boundary capacity threshold, an increase in the discharge temperature of the second compressor (22) can be suppressed.

[Operation Control]

Figure 6:
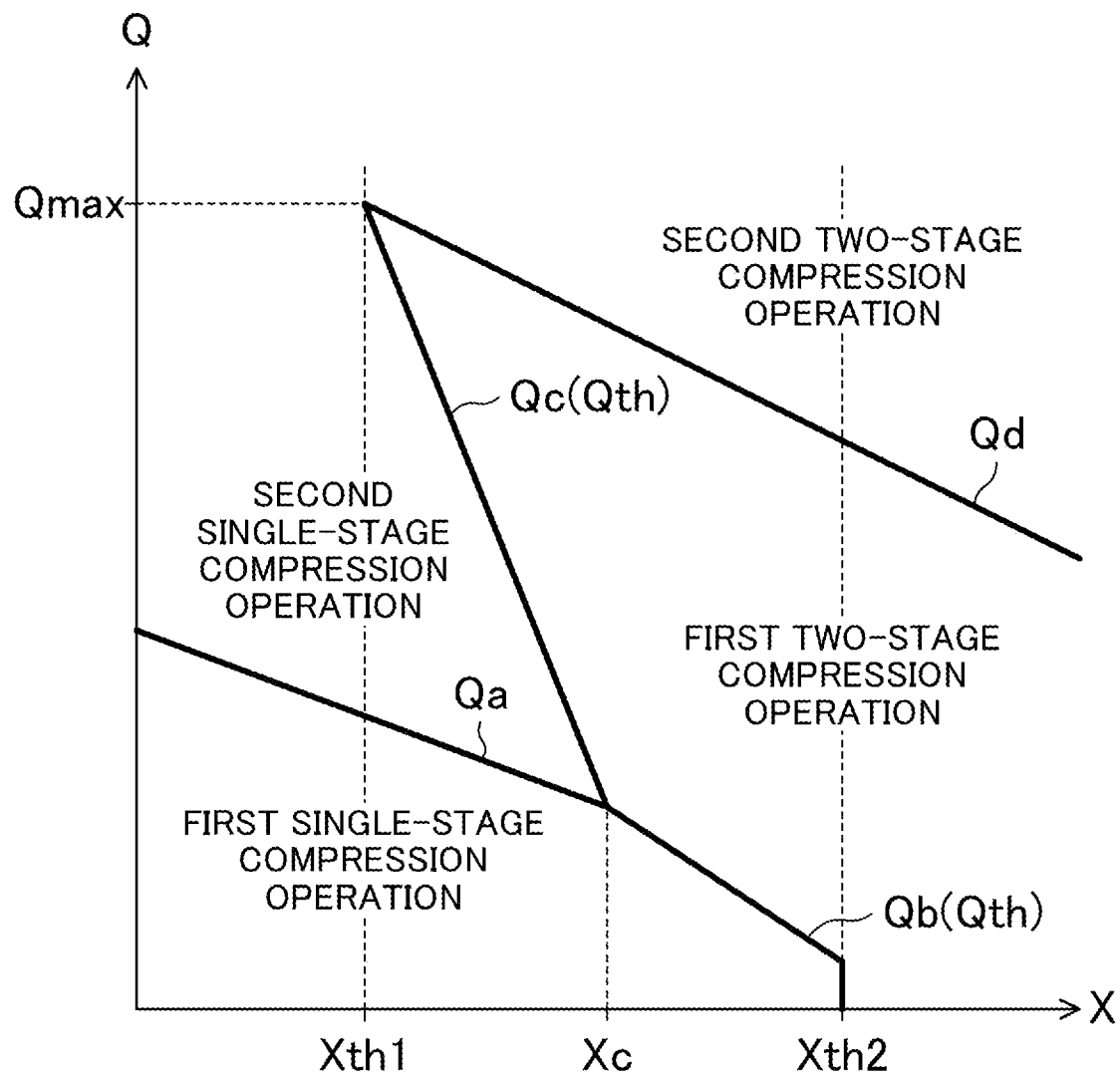
FIG. 6 is a graph for describing operation control of the refrigeration cycle device of Embodiment 2.

Next, operation control of the refrigeration cycle device (10) of Embodiment 2 will be described with reference to FIG. 6. As in the modification example of Embodiment 1, the control unit (100) controls the refrigerant circuit (20) so that the single-stage compression operation is performed regardless of the required capacity (Q) of the refrigerant circuit (20) if the physical quantity (X) is below the first physical quantity threshold (Xth1). The control unit (100) controls the refrigerant circuit (20) so that the two-stage compression operation is performed regardless of the required capacity (Q) of the refrigerant circuit (20) if the physical quantity (X) is above the second physical quantity threshold (Xth2). The second physical quantity threshold (Xth2) is greater than the first physical quantity threshold (Xth1). If the physical quantity (X) is not below the first physical quantity threshold (Xth1) and is not above the second physical quantity threshold (Xth2), the control unit (100) controls the refrigerant circuit (20) so that either one of the single-stage compression operation and the two-stage compression operation is performed in accordance with a result of comparison between the physical quantity (X) and the capacity threshold (Qth). The control unit (100) controls the refrigerant circuit (20) so that, of the single-stage compression operation and the two-stage compression operation, an operation with a higher compression efficiency is performed.

In this example, the capacity threshold (Qth) is set to a predetermined first capacity threshold (Qb) if the physical quantity (X) is below a predetermined boundary physical quantity (Xc), and is set to a predetermined second capacity threshold (Qc) if the physical quantity (X) is not below the boundary physical quantity (Xc). The boundary physical quantity (Xc) is the physical quantity (X) corresponding to the above-described boundary high-low pressure difference, and is the physical quantity (X) at a boundary at which the compression efficiency in the first two-stage compression operation becomes constantly higher than the compression efficiency in the second single-stage compression operation regardless of the required capacity (Q) of the refrigerant circuit (20). In this example, the boundary physical quantity (Xc) is greater than the first physical quantity threshold (Xth1) and is smaller than the second physical quantity threshold (Xth2).

[First Capacity Threshold]

The first capacity threshold (Qb) is a value that changes in accordance with the physical quantity (X). The first capacity threshold (Qb) corresponds to the required capacity (Q) of the refrigerant circuit (20) at a boundary at which the compression efficiency in the first two-stage compression operation (the two-stage compression operation when the injection circuit (30) is in the third state) becomes higher than the compression efficiency in the first single-stage compression operation (the single-stage compression operation when the injection circuit (30) is in the first state) under a condition that the physical quantity (X) is the physical quantity (X) corresponding to the first capacity threshold (Qb).

In this example, the first capacity threshold (Qb) gradually decreases as the physical quantity (X) increases. Specifically, the first capacity threshold (Qb) gradually decreases as the physical quantity (X) increases from the boundary physical quantity (Xc) toward the second physical quantity threshold (Xth2). In this example, the line indicating changes in the first capacity threshold (Qb) based on changes in the physical quantity (X) is a straight line.

[Second Capacity Threshold]

The second capacity threshold (Qc) is a value that changes in accordance with the physical quantity (X). The second capacity threshold (Qc) corresponds to the required capacity (Q) of the refrigerant circuit (20) at a boundary at which the compression efficiency in the first two-stage compression operation (the two-stage compression operation when the injection circuit (30) is in the third state) becomes higher than the compression efficiency in the second single-stage compression operation (the single-stage compression operation when the injection circuit (30) is in the second state) under a condition that the physical quantity (X) is the physical quantity (X) corresponding to the second capacity threshold (Qc).

In this example, the second capacity threshold (Qc) gradually decreases as the physical quantity (X) increases. The second capacity threshold (Qc) is set to a maximum required capacity (Qmax), which is a maximum value of the required capacity (Q) of the refrigerant circuit (20), when the physical quantity (X) is the first physical quantity threshold (Xth1). When the physical quantity (X) is the boundary physical quantity (Xc), the second capacity threshold (Qc) is set to the required capacity at a boundary at which the compression efficiency in the first two-stage compression operation becomes higher than the compression efficiency in the second single-stage compression operation (in this example, the first capacity threshold (Qb)). Specifically, as the physical quantity (X) increases from the first physical quantity threshold (Xth1) toward the boundary physical quantity (Xc), the second capacity threshold (Qc) gradually decreases from the maximum required capacity (Qmax) toward the first capacity threshold (Qb) when the physical quantity (X) is the boundary physical quantity (Xc). In this example, the line indicating changes in the second capacity threshold (Qc) based on changes in the physical quantity (X) is a straight line. For example, the maximum required capacity (Qmax) at the first physical quantity threshold (Xth1) is regarded as a start point, the first capacity threshold (Qb) at the boundary physical quantity (Xc) is regarded as an end point, and interpolation (in this example, linear interpolation) is performed between the start point and the end point. Accordingly, a line indicating changes in the second capacity threshold (Qc) based on changes in the physical quantity (X) can be derived.

[Switching of State of Injection Circuit]

The control unit (100) compares the required capacity (Q) of the refrigerant circuit (20) with a predetermined single-stage capacity threshold (Qa) under a condition of controlling the refrigerant circuit (20) so that the single-stage compression operation is performed. If the required capacity (Q) of the refrigerant circuit (20) is below the single-stage capacity threshold (Qa), the control unit (100) switches the injection circuit (30) to the first state. If the required capacity (Q) of the refrigerant circuit (20) is not below the single-stage capacity threshold (Qa), the control unit (100) switches the injection circuit (30) to the second state.

The control unit (100) compares the required capacity (Q) of the refrigerant circuit (20) with a predetermined two-stage capacity threshold (Qd) under a condition of controlling the refrigerant circuit (20) so that the two-stage compression operation is performed. If the required capacity (Q) of the refrigerant circuit (20) is below the predetermined two-stage capacity threshold (Qd), the control unit (100) switches the injection circuit (30) to the third state. If the required capacity (Q) of the refrigerant circuit (20) is not below the two-stage capacity threshold (Qd), the control unit (100) switches the injection circuit (30) to the fourth state.

[Single-Stage Capacity Threshold]

The single-stage capacity threshold (Qa) is a value that changes in accordance with the physical quantity (X). The single-stage capacity threshold (Qa) corresponds to the required capacity (Q) of the refrigerant circuit (20) at a boundary at which the compression efficiency in the second single-stage compression operation (the single-stage compression operation when the injection circuit (30) is in the second state) becomes higher than the compression efficiency in the first single-stage compression operation (the single-stage compression operation when the injection circuit (30) is in the first state) under a condition that the physical quantity (X) is the physical quantity (X) corresponding to the single-stage capacity threshold (Qa).

In this example, the single-stage capacity threshold (Qa) gradually decreases as the physical quantity (X) increases. Specifically, the single-stage capacity threshold (Qa) gradually decreases as the physical quantity (X) increases toward the boundary physical quantity (Xc). In this example, the line indicating changes in the single-stage capacity threshold (Qa) based on changes in the physical quantity (X) is a straight line. The line indicating changes in the single-stage capacity threshold (Qa) based on changes in the physical quantity (X) is connected to the line indicating changes in the capacity threshold (Qth) based on changes in the physical quantity (X) in the boundary physical quantity (Xc) (specifically, the line of the first capacity threshold (Qb) and the line of the second capacity threshold (Qc)).

[Two-Stage Capacity Threshold]

The two-stage capacity threshold (Qd) is a value that changes in accordance with the physical quantity (X). The two-stage capacity threshold (Qd) corresponds to the required capacity (Q) of the refrigerant circuit (20) at a boundary at which the temperature of the refrigerant discharged by the second compressor (22) in the first two-stage compression operation (the two-stage compression operation when the injection circuit (30) is in the third state) becomes higher than a predetermined allowed discharge temperature under a condition that the physical quantity (X) is the physical quantity (X) corresponding to the two-stage capacity threshold (Qd).

In this example, the two-stage capacity threshold (Qd) gradually decreases as the physical quantity (X) increases. The two-stage capacity threshold (Qd) is set to the maximum required capacity (Qmax) when the physical quantity (X) is the first physical quantity threshold (Xth1). Specifically, the two-stage capacity threshold (Qd) gradually decreases from the maximum required capacity (Qmax) as the physical quantity (X) increases from the first physical quantity threshold (Xth1). In this example, the line indicating changes in the two-stage capacity threshold (Qd) based on changes in the physical quantity (X) is a straight line.

[Specific Example of Operation Control]

For example, the control unit (100) controls the refrigerant circuit (20) and the injection circuit (30) in the following procedure.

<Determination of Physical Quantity>

First, the control unit (100) compares the physical quantity (X), the first physical quantity threshold (Xth1), the boundary physical quantity (Xc), and the second physical quantity threshold (Xth2) with each other. In this example, the boundary physical quantity (Xc) is greater than the first physical quantity threshold (Xth1) and is smaller than the second physical quantity threshold (Xth2).

<Physical Quantity (X)<First Physical Quantity Threshold (Xth1)>

If the physical quantity (X) is below the first physical quantity threshold (Xth1), the control unit (100) performs low-side capacity determination. In the low-side capacity determination, the control unit (100) compares the required capacity (Q) of the refrigerant circuit (20) with the single-stage capacity threshold (Qa).

If the required capacity (Q) is below the single-stage capacity threshold (Qa), the control unit (100) controls the refrigerant circuit (20) and the injection circuit (30) so that the first single-stage compression operation is performed. If the required capacity (Q) is not below the single-stage capacity threshold (Qa), the control unit (100) controls the refrigerant circuit (20) and the injection circuit (30) so that the second single-stage compression operation is performed.

<First Physical Quantity Threshold (Xth1) Physical Quantity (X)<Boundary Physical Quantity (Xc)>

If the physical quantity (X) is not below the first physical quantity threshold (Xth1) but is below the boundary physical quantity (Xc), the control unit (100) performs first intermediate capacity determination. In the first intermediate capacity determination, the control unit (100) compares the required capacity (Q) of the refrigerant circuit (20), the single-stage capacity threshold (Qa), and the second capacity threshold (Qc) with each other.

If the required capacity (Q) is below the single-stage capacity threshold (Qa), the control unit (100) controls the refrigerant circuit (20) and the injection circuit (30) so that the first single-stage compression operation is performed. If the required capacity (Q) is not below the single-stage capacity threshold (Qa) but is below the second capacity threshold (Qc), the control unit (100) controls the refrigerant circuit (20) and the injection circuit (30) so that the second single-stage compression operation is performed. If the required capacity (Q) is not below the second capacity threshold (Qc) but is below the two-stage capacity threshold (Qd), the control unit (100) controls the refrigerant circuit (20) and the injection circuit (30) so that the first two-stage compression operation is performed. If the required capacity (Q) is not below the two-stage capacity threshold (Qd), the control unit (100) controls the refrigerant circuit (20) and the injection circuit (30) so that the second two-stage compression operation is performed.

<Boundary Physical Quantity (Xc)<Physical Quantity (X)<Second Physical Quantity Threshold (Xth2)>

If the physical quantity (X) is not below the boundary physical quantity (Xc) but is below the second physical quantity threshold (Xth2), the control unit (100) performs second intermediate capacity determination. In the second intermediate capacity determination, the control unit (100) compares the required capacity (Q) of the refrigerant circuit (20), the first capacity threshold (Qb), and the two-stage capacity threshold (Qd) with each other.

If the required capacity (Q) is below the first capacity threshold (Qb), the control unit (100) controls the refrigerant circuit (20) and the injection circuit (30) so that the first single-stage compression operation is performed. If the required capacity (Q) is not below the first capacity threshold (Qb) but is below the two-stage capacity threshold (Qd), the control unit (100) controls the refrigerant circuit (20) and the injection circuit (30) so that the first two-stage compression operation is performed. If the required capacity (Q) is not below the two-stage capacity threshold (Qd), the control unit (100) controls the refrigerant circuit (20) and the injection circuit (30) so that the second two-stage compression operation is performed.

<Physical Quantity (X) Second Physical Quantity Threshold (Xth2)>

If the physical quantity (X) is not below the second physical quantity threshold (Xth2), the control unit (100) performs high-side capacity determination. In the high-side capacity determination, the control unit (100) compares the required capacity (Q) of the refrigerant circuit (20) with the two-stage capacity threshold (Qd).

If the required capacity (Q) is below the two-stage capacity threshold (Qd), the control unit (100) controls the refrigerant circuit (20) and the injection circuit (30) so that the first two-stage compression operation is performed. If the required capacity (Q) is not below the two-stage capacity threshold (Qd), the control unit (100) controls the refrigerant circuit (20) and the injection circuit (30) so that the second two-stage compression operation is performed.

Feature (1) of Embodiment 2

As described above, in the refrigeration cycle device (10) of the present embodiment, one of the first compressor (21) and the second compressor (22) is the injection compressor (20a), the injection compressor (20a) includes a compression chamber for compressing refrigerant and is configured to be able to supply refrigerant to the compression chamber that is performing compression, and the injection compressor (20a) is driven in the single-stage compression operation. In the single-stage compression operation, the injection circuit (30) is switched between the first state in which part of refrigerant flowing from, of the heat-source-side heat exchanger (24) and the use-side heat exchanger (27), a heat exchanger serving as a radiator toward the expansion mechanism (26) is not supplied to either of the suction side of the second compressor (22) and the compression chamber that is performing compression of the injection compressor (20a), and the second state in which the part of the refrigerant is supplied to the compression chamber that is performing compression of the injection compressor (20a). In the two-stage compression operation, the injection circuit (30) is switched to the third state in which the part of the refrigerant flowing from, of the heat-source-side heat exchanger (24) and the use-side heat exchanger (27), a heat exchanger serving as a radiator toward the expansion mechanism (26) is supplied to the suction side of the second compressor (22).

In the present embodiment, the injection circuit (30) can be switched between the first state and the second state in the single-stage compression operation. Thus, an increase in the discharge temperature of the second compressor (22) can be appropriately suppressed by using injection. Accordingly, the range in which the refrigeration cycle device (10) can operate in the single-stage compression operation (the range of the difference between a high pressure and a low pressure in the refrigerant circuit (20)) can be widened. In addition, the flow rate of refrigerant in the second compressor (22) can be increased by injection, and thus the capacity range of the refrigeration cycle device (10) can be widened.

In the present embodiment, switching between the first state (or the second state) and the third state of the injection circuit (30) can be performed together with switching between the single-stage compression operation and the two-stage compression operation. Accordingly, switching between the single-stage compression operation and the two-stage compression operation can be appropriately performed in consideration of a boundary at which the compression efficiency in the two-stage compression operation becomes higher than the compression efficiency in the single-stage compression operation.

In more detail, as a result of performing switching between the first state (or the second state) and the third state of the injection circuit (30) together with switching between the single-stage compression operation and the two-stage compression operation, an effect similar to that of Embodiment 1 can be obtained.

For example, when the compression efficiency in the refrigeration cycle device (10) is about to decrease because of an increase in the difference between a high pressure and a low pressure in the refrigerant circuit (20) (or an increase in the required capacity (Q) of the refrigerant circuit (20)) during the first single-stage compression operation or the second single-stage compression operation, the single-stage compression operation is switched to the two-stage compression operation, and the state of the injection circuit (30) is switched from the first state or the second state to the third state. When the compression efficiency in the refrigeration cycle device (10) is about to decrease because of a decrease in the difference between a high pressure and a low pressure in the refrigerant circuit (20) (or a decrease in the required capacity (Q) of the refrigerant circuit (20)) during the first two-stage compression operation, the two-stage compression operation is switched to the single-stage compression operation, and the state of the injection circuit (30) is switched from the third state to the first state or the second state.

Feature (2) of Embodiment 2

In the refrigeration cycle device (10) of the present embodiment, the control unit (100) switches the injection circuit (30) to the first state if the required capacity (Q) of the refrigerant circuit (20) is below the predetermined single-stage capacity threshold (Qa) and switches the injection circuit (30) to the second state if the required capacity (Q) of the refrigerant circuit (20) is not below the single-stage capacity threshold (Qa) under a condition of controlling the refrigerant circuit (20) so that the single-stage compression operation is performed. The single-stage capacity threshold (Qa) is a value that changes in accordance with the physical quantity (X), and corresponds to the required capacity (Q) of the refrigerant circuit (20) at a boundary at which the compression efficiency in the single-stage compression operation when the injection circuit (30) is in the second state becomes higher than the compression efficiency in the single-stage compression operation when the injection circuit (30) is in the first state under a condition that the physical quantity (X) is a physical quantity (X) corresponding to the single-stage capacity threshold (Qa).

In the present embodiment, the state of the injection circuit (30) in the single-stage compression operation can be switched between the first state and the second state in consideration of a boundary at which the compression efficiency in the single-stage compression operation when the injection circuit (30) is in the second state (hereinafter referred to as a "second single-stage compression operation") becomes higher than the compression efficiency in the single-stage compression operation when the injection circuit (30) is in the first state (hereinafter referred to as a "first single-stage compression operation"). Accordingly, the compression efficiency in the single-stage compression operation of the refrigeration cycle device (10) can be improved.

Feature (3) of Embodiment 2

In the refrigeration cycle device (10) of the present embodiment, the single-stage capacity threshold (Qa) gradually decreases as the physical quantity (X) increases.

In the present embodiment, switching between the first state and the second state of the injection circuit (30) can be appropriately performed in consideration of a boundary at which the compression efficiency in the second single-stage compression operation becomes higher than the compression efficiency in the first single-stage compression operation.

Feature (4) of Embodiment 2

In the refrigeration cycle device (10) of the present embodiment, the injection circuit (30) is switched, in the two-stage compression operation, between the third state and the fourth state in which part of refrigerant flowing from, of the heat-source-side heat exchanger (24) and the use-side heat exchanger (27), a heat exchanger serving as a radiator toward the expansion mechanism (26) is supplied to both the suction side of the second compressor (22) and the compression chamber that is performing compression of the injection compressor (20a).

In the present embodiment, the injection circuit (30) can be switched between the third state and the fourth state in the two-stage compression operation. Thus, an increase in the discharge temperature of the second compressor (22) can be appropriately suppressed by using injection. Accordingly, the range in which the refrigeration cycle device (10) can operate in the two-stage compression operation (the range of the difference between a high pressure and a low pressure in the refrigerant circuit (20)) can be widened.

In the present embodiment, as a result of switching the injection circuit (30) from the third state to the fourth state, refrigerant can be cooled twice in the path extending from the suction side of the first compressor (21) to the discharge side of the second compressor (22). Thus, the theoretical power of the second compressor (22) can be further reduced. Accordingly, the operation efficiency (for example, COP) of the refrigeration cycle device (10) can be increased.

Feature (5) of Embodiment 2

In the refrigeration cycle device (10) of the present embodiment, the control unit (100) switches the injection circuit (30) to the third state if the required capacity (Q) of the refrigerant circuit (20) is below the predetermined two-stage capacity threshold (Qd) and switches the injection circuit (30) to the fourth state if the required capacity (Q) of the refrigerant circuit (20) is not below the two-stage capacity threshold (Qd) under a condition of controlling the refrigerant circuit (20) so that the two-stage compression operation is performed. The two-stage capacity threshold (Qd) is a value that changes in accordance with the physical quantity (X), and corresponds to the required capacity (Q) of the refrigerant circuit (20) at a boundary at which the temperature of refrigerant discharged by the second compressor (22) becomes higher than the predetermined allowed discharge temperature in the two-stage compression operation when the injection circuit (30) is in the third state under a condition that the physical quantity (X) is a physical quantity (X) corresponding to the two-stage capacity threshold (Qd).

In the present embodiment, the state of the injection circuit (30) in the two-stage compression operation can be switched between the third state and the fourth state in consideration of a boundary at which the discharge temperature of the second compressor (22) becomes higher than the allowed discharge temperature in the two-stage compression operation when the injection circuit (30) is in the third state (hereinafter referred to as a "first two-stage compression operation"). Accordingly, an increase in the discharge temperature of the second compressor (22) in the two-stage compression operation can be appropriately suppressed, and the second compressor (22) can be protected against breakdown from a high temperature.

Feature (6) of Embodiment 2

In the refrigeration cycle device (10) of the present embodiment, the two-stage capacity threshold (Qd) gradually decreases as the physical quantity (X) increases.

In the present embodiment, switching between the third state and the fourth state of the injection circuit (30) can be appropriately performed in consideration of a boundary at which the discharge temperature of the second compressor (22) becomes higher than the allowed discharge temperature in the first two-stage compression operation.

Modification Example of Embodiment 2

The capacity threshold (Qth) and the single-stage capacity threshold (Qa) change in accordance with the design conditions (for example, design compression ratios) of the first compressor (21) and the second compressor (22). Thus, for example, the capacity threshold (Qth) may be set only to the second capacity threshold (Qc), not to the first capacity threshold (Qb), as illustrated in FIG. 7 or FIG. 8.

Figure 7:
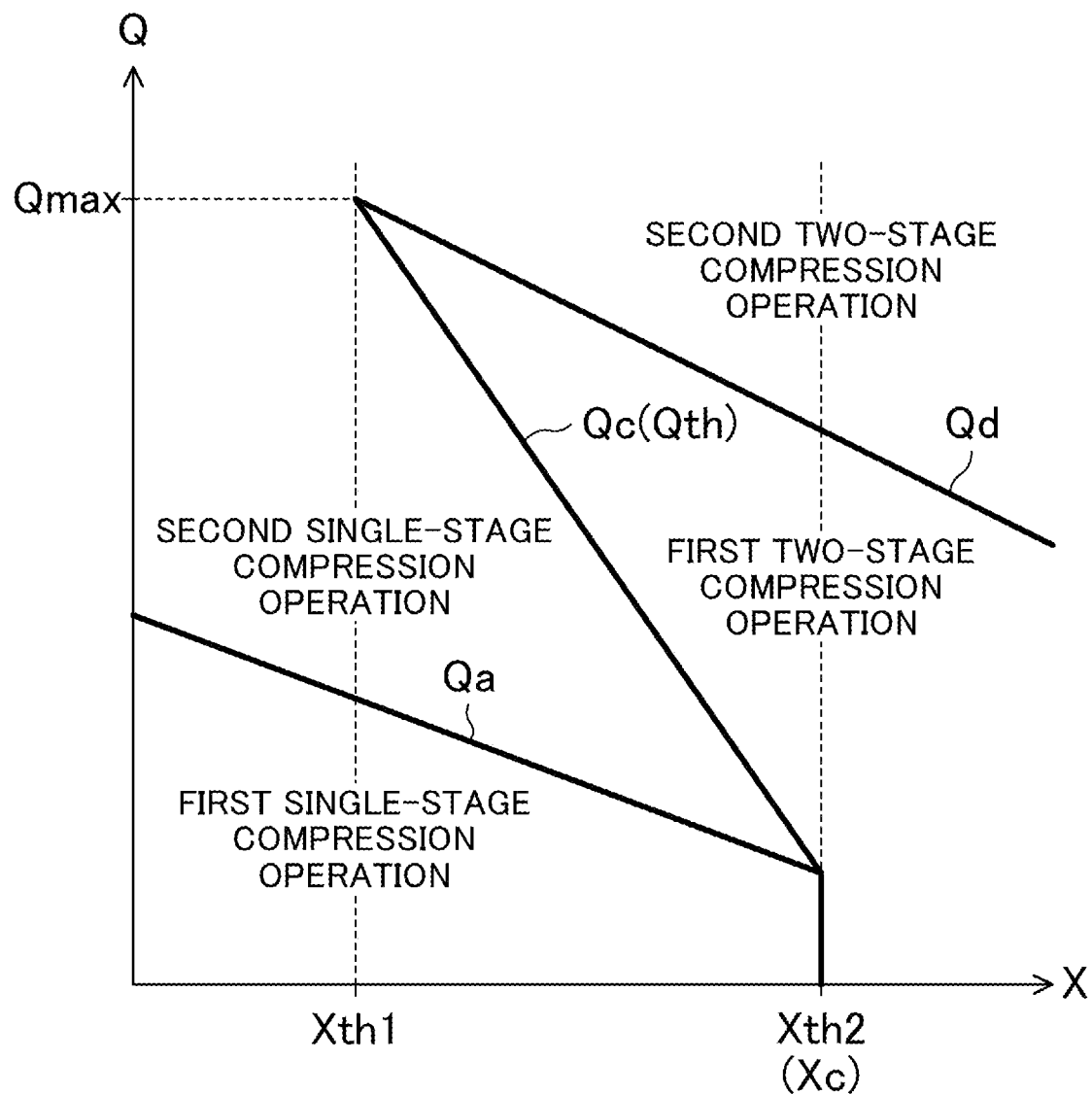
FIG. 7 is a graph for describing operation control of a refrigeration cycle device of a modification example of Embodiment 2.

In the example in FIG. 7, the boundary physical quantity (Xc) matches the second physical quantity threshold (Xth2). The line indicating changes in the capacity threshold (Qth) based on changes in the physical quantity (X) matches the line indicating changes in the second capacity threshold (Qc) based on changes in the physical quantity (X). The line indicating changes in the second capacity threshold (Qc) based on changes in the physical quantity (X) is connected to the line indicating changes in the single-stage capacity threshold (Qa) based on changes in the physical quantity (X) in the second physical quantity threshold (Xth2).

Figure 8:
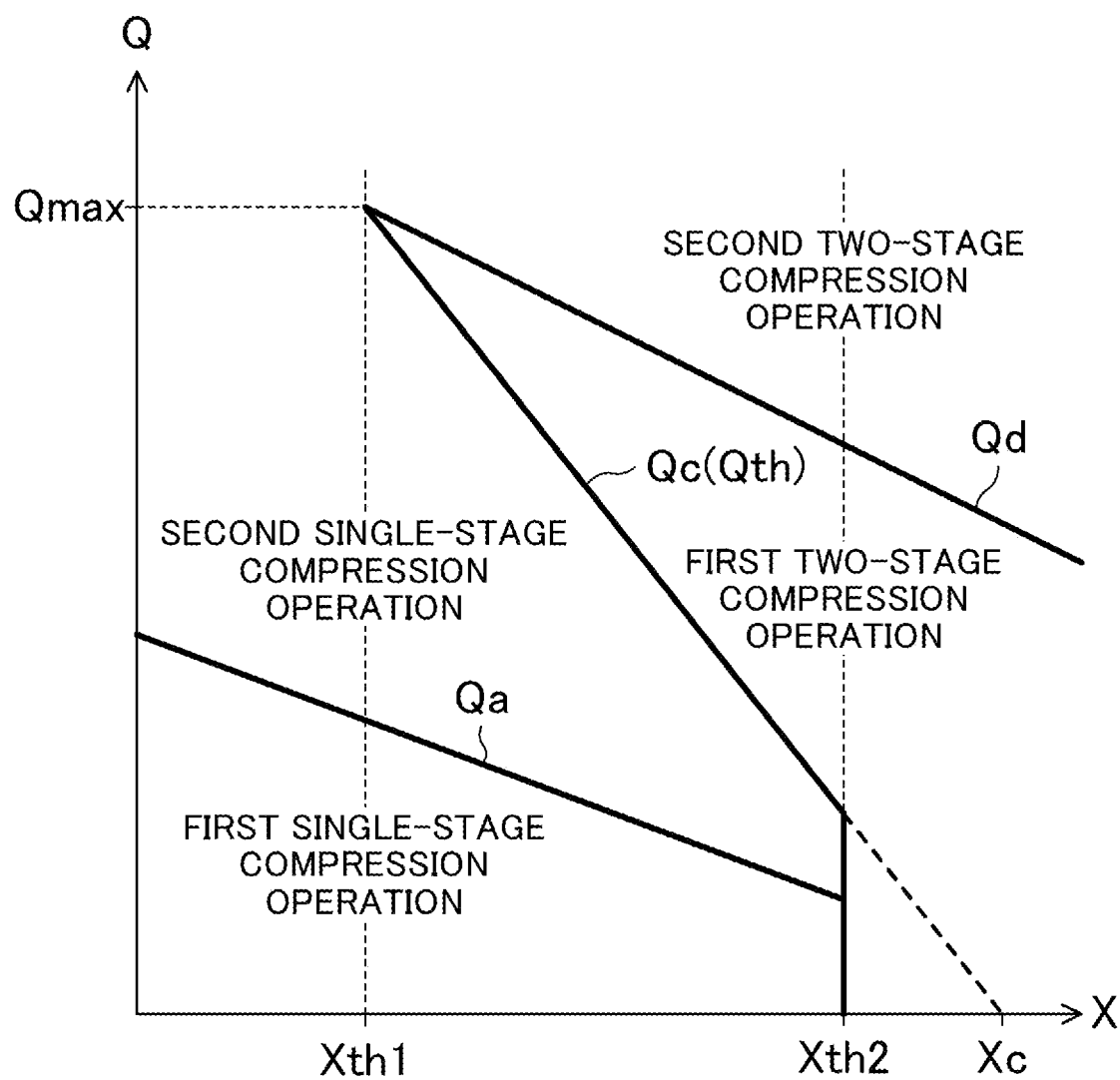
FIG. 8 is another graph for describing operation control of the refrigeration cycle device of the modification example of Embodiment 2.

In the example in FIG. 8, the boundary physical quantity (Xc) is greater than the second physical quantity threshold (Xth2). The line indicating changes in the capacity threshold (Qth) based on changes in the physical quantity (X) matches the line indicating changes in the second capacity threshold (Qc) based on changes in the physical quantity (X). The line indicating changes in the second capacity threshold (Qc) based on changes in the physical quantity (X) is not connected to the line indicating changes in the single-stage capacity threshold (Qa) based on changes in the physical quantity (X).

In the case of the example in FIG. 7 or FIG. 8, the control unit (100) may be configured to perform intermediate capacity determination instead of the above-described first intermediate capacity determination and second intermediate capacity determination. The intermediate capacity determination is performed if the physical quantity (X) is not below the first physical quantity threshold (Xth1) but is below the second physical quantity threshold (Xth2). In the intermediate capacity determination, the control unit (100) compares the required capacity (Q) of the refrigerant circuit (20), the single-stage capacity threshold (Qa), and the capacity threshold (Qth) (specifically, the second capacity threshold (Qc)) with each other.

If the required capacity (Q) is below the single-stage capacity threshold (Qa), the control unit (100) controls the refrigerant circuit (20) and the injection circuit (30) so that the first single-stage compression operation is performed. If the required capacity (Q) is not below the single-stage capacity threshold (Qa) but is below the first capacity threshold (Qb), the control unit (100) controls the refrigerant circuit (20) and the injection circuit (30) so that the second single-stage compression operation is performed. If the required capacity (Q) is not below the first capacity threshold (Qb) but is below the two-stage capacity threshold (Qd), the control unit (100) controls the refrigerant circuit (20) and the injection circuit (30) so that the first two-stage compression operation is performed. If the required capacity (Q) is not below the two-stage capacity threshold (Qd), the control unit (100) controls the refrigerant circuit (20) and the injection circuit (30) so that the second two-stage compression operation is performed.

Other Embodiments

In the above description, a case has been given as an example in which the line indicating changes in the capacity threshold (Qth) based on changes in the physical quantity (X) is a straight line, but the present disclosure is not limited thereto. For example, the line indicating changes in the capacity threshold (Qth) based on changes in the physical quantity (X) may be a curve that is convex downward or a curve that is convex upward. The same applies to the first capacity threshold (Qb) and the second capacity threshold (Qc) constituting the capacity threshold (Qth), the single-stage capacity threshold (Qa), and the two-stage capacity threshold (Qd).

In the above description, R410A, R32, R407C, and the like are given as specific examples of refrigerant. However, the refrigerant may be another type of refrigerant. For example, the refrigerant may be carbon dioxide.

The embodiments and modification examples have been described above. It is to be understood that the embodiments and the details can be variously changed without deviating from the gist and scope of the claims. The above embodiments and modification examples may be combined or replaced as appropriate as long as target functions of the present disclosure are not impaired.

INDUSTRIAL APPLICABILITY

As described above, the present disclosure is useful as a refrigeration cycle device.

REFERENCE SIGNS LIST 10 refrigeration cycle device
20 refrigerant circuit
20a injection compressor
21 first compressor
22 second compressor
23 four-way switching valve
24 heat-source-side heat exchanger
25 check valve bridge
26 expansion mechanism
27 use-side heat exchanger
28 accumulator
29 bypass check valve
30 injection circuit
31 injection expansion valve
32 decompression valve
33 injection check valve
40 intermediate heat exchanger

The invention claimed is:

1. A refrigeration cycle device comprising:
a refrigerant circuit including a first compressor, a second compressor, a heat-source-side heat exchanger, an expansion mechanism, and a use-side heat exchanger, and capable of performing a single-stage compression operation in which one of the first compressor and the second compressor is driven and an other is stopped, and a two-stage compression operation in which both the first compressor and the second compressor are driven; and
a controller configured to control the refrigerant circuit so that, of the single-stage compression operation and the two-stage compression operation, an operation with a higher compression efficiency is performed, wherein
in a first operation in which a required capacity of the refrigerant circuit is below a predetermined capacity threshold, the controller is configured to control the refrigerant circuit so that the single-stage compression operation is performed,
in a second operation in which the required capacity of the refrigerant circuit is not below the predetermined capacity threshold, the controller is configured to control the refrigerant circuit so that the two-stage compression operation is performed, and
the predetermined capacity threshold is a value that changes in accordance with a physical quantity indicating a difference between a quantity correlated with a high pressure in the refrigerant circuit and a quantity correlated with a low pressure in the refrigerant circuit.

2. The refrigeration cycle device according to claim 1, wherein the predetermined capacity threshold corresponds to the required capacity of the refrigerant circuit at a boundary at which a compression efficiency in the two-stage compression operation becomes higher than a compression efficiency in the single-stage compression operation under a condition that the physical quantity is a physical quantity corresponding to the predetermined capacity threshold.

3. The refrigeration cycle device according to claim 2, wherein
the predetermined capacity threshold gradually decreases as the physical quantity increases.

4. The refrigeration cycle device according to claim 3, wherein
the controller is configured to
control the refrigerant circuit so that the single-stage compression operation is performed regardless of the required capacity of the refrigerant circuit when the physical quantity is below a predetermined first physical quantity threshold, and
control the refrigerant circuit so that the two-stage compression operation is performed regardless of the required capacity of the refrigerant circuit when the physical quantity is above a second physical quantity threshold that is greater than the first physical quantity threshold.

5. The refrigeration cycle device according to claim 4, comprising
an injection circuit, wherein
the second compressor is configured to suck refrigerant discharged by the first compressor in the two-stage compression operation, and
the injection circuit is configured to supply, to a suction side of the second compressor, part of refrigerant flowing from, of the heat-source-side heat exchanger and the use-side heat exchanger, a heat exchanger serving as a radiator toward the expansion mechanism in the two-stage compression operation.

6. The refrigeration cycle device according to claim 5, wherein
one of the first compressor and the second compressor is an injection compressor,
the injection compressor includes a compression chamber for compressing refrigerant and is configured to be able to supply refrigerant to the compression chamber that is performing compression,
the injection compressor is driven in the single-stage compression operation, and
the injection circuit is configured to
be switched, in the single-stage compression operation, between a first state in which the part of the refrigerant flowing from, of the heat-source-side heat exchanger and the use-side heat exchanger, the heat exchanger serving as a radiator toward the expansion mechanism is not supplied to either of the suction side of the second compressor and the compression chamber that is performing compression of the injection compressor, and a second state in which the part of the refrigerant is supplied to the compression chamber that is performing compression of the injection compressor, and
be switched, in the two-stage compression operation, to a third state in which the part of the refrigerant flowing from, of the heat-source-side heat exchanger and the use-side heat exchanger, the heat exchanger serving as a radiator toward the expansion mechanism is supplied to the suction side of the second compressor.

7. The refrigeration cycle device according to claim 3, comprising
an injection circuit, wherein
the second compressor is configured to suck refrigerant discharged by the first compressor in the two-stage compression operation, and
the injection circuit is configured to supply, to a suction side of the second compressor, part of refrigerant flowing from, of the heat-source-side heat exchanger and the use-side heat exchanger, a heat exchanger serving as a radiator toward the expansion mechanism in the two-stage compression operation.

8. The refrigeration cycle device according to claim 7, wherein
one of the first compressor and the second compressor is an injection compressor,
the injection compressor includes a compression chamber for compressing refrigerant and is configured to be able to supply refrigerant to the compression chamber that is performing compression,
the injection compressor is driven in the single-stage compression operation, and
the injection circuit is configured to
be switched, in the single-stage compression operation, between a first state in which the part of the refrigerant flowing from, of the heat-source-side heat exchanger and the use-side heat exchanger, the heat exchanger serving as a radiator toward the expansion mechanism is not supplied to either of the suction side of the second compressor and the compression chamber that is performing compression of the injection compressor, and a second state in which the part of the refrigerant is supplied to the compression chamber that is performing compression of the injection compressor, and
be switched, in the two-stage compression operation, to a third state in which the part of the refrigerant flowing from, of the heat-source-side heat exchanger and the use-side heat exchanger, the heat exchanger serving as a radiator toward the expansion mechanism is supplied to the suction side of the second compressor.

9. The refrigeration cycle device according to claim 8, wherein
the controller is configured to, under a condition of controlling the refrigerant circuit so that the single-stage compression operation is performed, switch the injection circuit to the first state in a third operation in which the required capacity of the refrigerant circuit is below a predetermined single-stage capacity threshold and switch the injection circuit to the second state in a fourth operation in which the required capacity of the refrigerant circuit is not below the single-stage capacity threshold, and
the single-stage capacity threshold is a value that changes in accordance with the physical quantity, and corresponds to the required capacity of the refrigerant circuit at a boundary at which a compression efficiency in the single-stage compression operation when the injection circuit is in the second state becomes higher than a compression efficiency in the single-stage compression operation when the injection circuit is in the first state under a condition that the physical quantity is a physical quantity corresponding to the single-stage capacity threshold.

10. The refrigeration cycle device according to claim 2, wherein
the controller is configured to
control the refrigerant circuit so that the single-stage compression operation is performed regardless of the required capacity of the refrigerant circuit when the physical quantity is below a predetermined first physical quantity threshold, and
control the refrigerant circuit so that the two-stage compression operation is performed regardless of the required capacity of the refrigerant circuit when the physical quantity is above a second physical quantity threshold that is greater than the first physical quantity threshold.

11. The refrigeration cycle device according to claim 10, comprising
an injection circuit, wherein
the second compressor is configured to suck refrigerant discharged by the first compressor in the two-stage compression operation, and
the injection circuit is configured to supply, to a suction side of the second compressor, part of refrigerant flowing from, of the heat-source-side heat exchanger and the use-side heat exchanger, a heat exchanger serving as a radiator toward the expansion mechanism in the two-stage compression operation.

12. The refrigeration cycle device according to claim 11, wherein
one of the first compressor and the second compressor is an injection compressor,
the injection compressor includes a compression chamber for compressing refrigerant and is configured to be able to supply refrigerant to the compression chamber that is performing compression,
the injection compressor is driven in the single-stage compression operation, and
the injection circuit is configured to
be switched, in the single-stage compression operation, between a first state in which the part of the refrigerant flowing from, of the heat-source-side heat exchanger and the use-side heat exchanger, the heat exchanger serving as a radiator toward the expansion mechanism is not supplied to either of the suction side of the second compressor and the compression chamber that is performing compression of the injection compressor, and a second state in which the part of the refrigerant is supplied to the compression chamber that is performing compression of the injection compressor, and
be switched, in the two-stage compression operation, to a third state in which the part of the refrigerant flowing from, of the heat-source-side heat exchanger and the use-side heat exchanger, the heat exchanger serving as a radiator toward the expansion mechanism is supplied to the suction side of the second compressor.

13. The refrigeration cycle device according to claim 12, wherein
the controller is configured to, under a condition of controlling the refrigerant circuit so that the single-stage compression operation is performed, switch the injection circuit to the first state in a third operation in which the required capacity of the refrigerant circuit is below a predetermined single-stage capacity threshold and switch the injection circuit to the second state in a fourth operation in which the required capacity of the refrigerant circuit is not below the single-stage capacity threshold, and the single-stage capacity threshold is a value that changes in accordance with the physical quantity, and corresponds to the required capacity of the refrigerant circuit at a boundary at which a compression efficiency in the single-stage compression operation when the injection circuit is in the second state becomes higher than a compression efficiency in the single-stage compression operation when the injection circuit is in the first state under a condition that the physical quantity is a physical quantity corresponding to the single-stage capacity threshold.

14. The refrigeration cycle device according to claim 2, comprising an injection circuit, wherein the second compressor is configured to suck refrigerant discharged by the first compressor in the two-stage compression operation, and the injection circuit is configured to supply, to a suction side of the second compressor, part of refrigerant flowing from, of the heat-source-side heat exchanger and the use-side heat exchanger, a heat exchanger serving as a radiator toward the expansion mechanism in the two-stage compression operation.

15. The refrigeration cycle device according to claim 14, wherein one of the first compressor and the second compressor is an injection compressor, the injection compressor includes a compression chamber for compressing refrigerant and is configured to be able to supply refrigerant to the compression chamber that is performing compression, the injection compressor is driven in the single-stage compression operation, and the injection circuit is configured to be switched, in the single-stage compression operation, between a first state in which the part of the refrigerant flowing from, of the heat-source-side heat exchanger and the use-side heat exchanger, the heat exchanger serving as a radiator toward the expansion mechanism is not supplied to either of the suction side of the second compressor and the compression chamber that is performing compression of the injection compressor, and a second state in which the part of the refrigerant is supplied to the compression chamber that is performing compression of the injection compressor, and be switched, in the two-stage compression operation, to a third state in which the part of the refrigerant flowing from, of the heat-source-side heat exchanger and the use-side heat exchanger, the heat exchanger serving as a radiator toward the expansion mechanism is supplied to the suction side of the second compressor.

16. The refrigeration cycle device according to claim 15, wherein the controller is configured to, under a condition of controlling the refrigerant circuit so that the single-stage compression operation is performed, switch the injection circuit to the first state in a third operation in which the required capacity of the refrigerant circuit is below a predetermined single-stage capacity threshold and switch the injection circuit to the second state in a fourth operation in which the required capacity of the refrigerant circuit is not below the single-stage capacity threshold, and the single-stage capacity threshold is a value that changes in accordance with the physical quantity, and corresponds to the required capacity of the refrigerant circuit at a boundary at which a compression efficiency in the single-stage compression operation when the injection circuit is in the second state becomes higher than a compression efficiency in the single-stage compression operation when the injection circuit is in the first state under a condition that the physical quantity is a physical quantity corresponding to the single-stage capacity threshold.

17. The refrigeration cycle device according to claim 16, wherein the single-stage capacity threshold gradually decreases as the physical quantity increases.

18. The refrigeration cycle device according to claim 15, wherein the injection circuit is configured to be switched, in the two-stage compression operation, between the third state and a fourth state in which the part of the refrigerant flowing from, of the heat-source-side heat exchanger and the use-side heat exchanger, the heat exchanger serving as a radiator toward the expansion mechanism is supplied to both the suction side of the second compressor and the compression chamber that is performing compression of the injection compressor.

19. The refrigeration cycle device according to claim 18, wherein the controller is configured to, under a condition of controlling the refrigerant circuit so that the two-stage compression operation is performed, switch the injection circuit to the third state when the required capacity of the refrigerant circuit is below a predetermined two-stage capacity threshold and switch the injection circuit to the fourth state when the required capacity of the refrigerant circuit is not below the two-stage capacity threshold, and the two-stage capacity threshold is a value that changes in accordance with the physical quantity, and corresponds to the required capacity of the refrigerant circuit at a boundary at which a temperature of refrigerant discharged by the second compressor becomes higher than a predetermined allowed discharge temperature in the two-stage compression operation when the injection circuit is in the third state under a condition that the physical quantity is a physical quantity corresponding to the two-stage capacity threshold.

20. The refrigeration cycle device according to claim 19, wherein the two-stage capacity threshold gradually decreases as the physical quantity increases.

* * * * *